US012810021B2

(12) United States Patent
Agrawal et al.

(10) Patent No.: US 12,810,021 B2
(45) Date of Patent: Nov. 24, 2026

(54) ACCIDENTAL COPY-PASTE ACTION PREVENTION

(71) Applicant: MOTOROLA MOBILITY LLC, Wilmington, DE (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 100 days.

(21) Appl. No.: 18/791,883

(22) Filed: Aug. 1, 2024

(65) Prior Publication Data

US 2026/0037662 A1 Feb. 5, 2026

(51) Int. Cl.
*G06F 21/62* (2013.01)
*G06F 40/295* (2020.01)

(52) U.S. Cl.
CPC ........ *G06F 21/6245* (2013.01); *G06F 40/295* (2020.01)

(58) Field of Classification Search
CPC .................................................. G06F 21/6245
USPC .......................................................... 726/27
See application file for complete search history.

(56) References Cited

U.S. PATENT DOCUMENTS 11,790,117 B2 * 10/2023 LaFever .............. G06F 21/6254 713/162
2012/0254547 A1 * 10/2012 Benhase ............. G06F 11/0727 711/E12.103
2015/0143255 A1 * 5/2015 Agrawal ................. H04L 51/48 715/752
2017/0147568 A1 * 5/2017 Chen ....................... G06F 16/11
2017/0154188 A1 * 6/2017 Meier .................... G06F 21/552
2019/0228186 A1 * 7/2019 Atreya ................ G06F 21/6218
2021/0124800 A1 * 4/2021 Williams .............. G06F 40/295
2023/0101774 A1 * 3/2023 West ..................... G06F 3/0488 715/770
2023/0123855 A1 * 4/2023 Sekhar .................... G06F 9/451 726/26
2023/0176806 A1 * 6/2023 Chen ..................... G06F 3/1454 715/764
2023/0195933 A1 * 6/2023 Satish Padmanabhan .................. G06F 40/263 726/26

(Continued)

FOREIGN PATENT DOCUMENTS

WO WO-2025094075 A1 * 5/2025 ........... G06F 40/284

*Primary Examiner* — Tauqir Hussain
(74) *Attorney, Agent, or Firm* — Isidore PLLC

(57) ABSTRACT

A method provides techniques for accidental copy-paste action prevention. The method includes obtaining, by a processor of an electronic device that includes a display and at least one input device, content selected via the at least one input device, from an application window that is rendered on the display. A source context from the selected content is determined. A paste operation that inserts the selected content into a communication window that is rendered on the display is detected. A destination context is determined, based at least in part on one or more participants in the communication window. A conflict between the source context and the destination context is identified. In response to identifying the conflict, a transmit option for forwarding the selected content via the communication window is suspended, preventing the information from being sent, and a context conflict alert is rendered on the display.

20 Claims, 18 Drawing Sheets

(56) References Cited

U.S. PATENT DOCUMENTS

| | | | | |
|---|---|---|---|---|
| 2024/0020466 | A1 * | 1/2024 | Gonzalez | G06F 3/0483 |
| 2024/0330043 | A1 * | 10/2024 | Grillo | G06Q 10/107 |
| 2025/0060863 | A1 * | 2/2025 | Sniffen | G06F 3/0484 |
| 2025/0308647 | A1 * | 10/2025 | Socolov | G16H 10/20 |
| 2025/0348568 | A1 * | 11/2025 | Pitschel | G06F 3/04886 |

* cited by examiner

ACCIDENTAL COPY-PASTE ACTION PREVENTION

BACKGROUND

1. Technical Field

The present disclosure generally relates to electronic devices, and more specifically to electronic devices that enabling copying and pasting of content.

2. Description of the Related Art

Copying and pasting content between different applications on a computer system offers numerous advantages and benefits, including enhancing productivity, efficiency, and user experience. A copy-paste action allows one to quickly transfer information without retyping, saving significant time. Moreover, a copy-paste action can serve to minimize typing errors by transferring exact content. Thus, the copy-paste action provides the feature of data transfer across different applications, enabling seamless integration and workflow. For example, it is possible to copy an image from a web browser and paste it into a document editor.

The copy-paste action is typically implemented via a 'clipboard,' which is a temporary storage area in a computer's memory used for transferring data within and between application programs via copy and paste (or cut and paste) operations. The clipboard acts as a temporary storage area where data such as text, images, files, and other types of data can be held for short periods. When a user performs a cut or copy action, the operating system copies the selected data into the clipboard. The copied data may remain available on the clipboard until another cut or copy action overwrites that data. To implement a paste operation, the computer system retrieves the data from the clipboard and inserts it at the current cursor position or selected location in the destination application. The ability to copy (or cut) and paste content between different applications is a fundamental feature that significantly enhances productivity, accuracy, and flexibility in computer use. The copy-paste action enables users to manage and integrate data efficiently, supports creative and collaborative work, and improves overall workflow efficiency.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
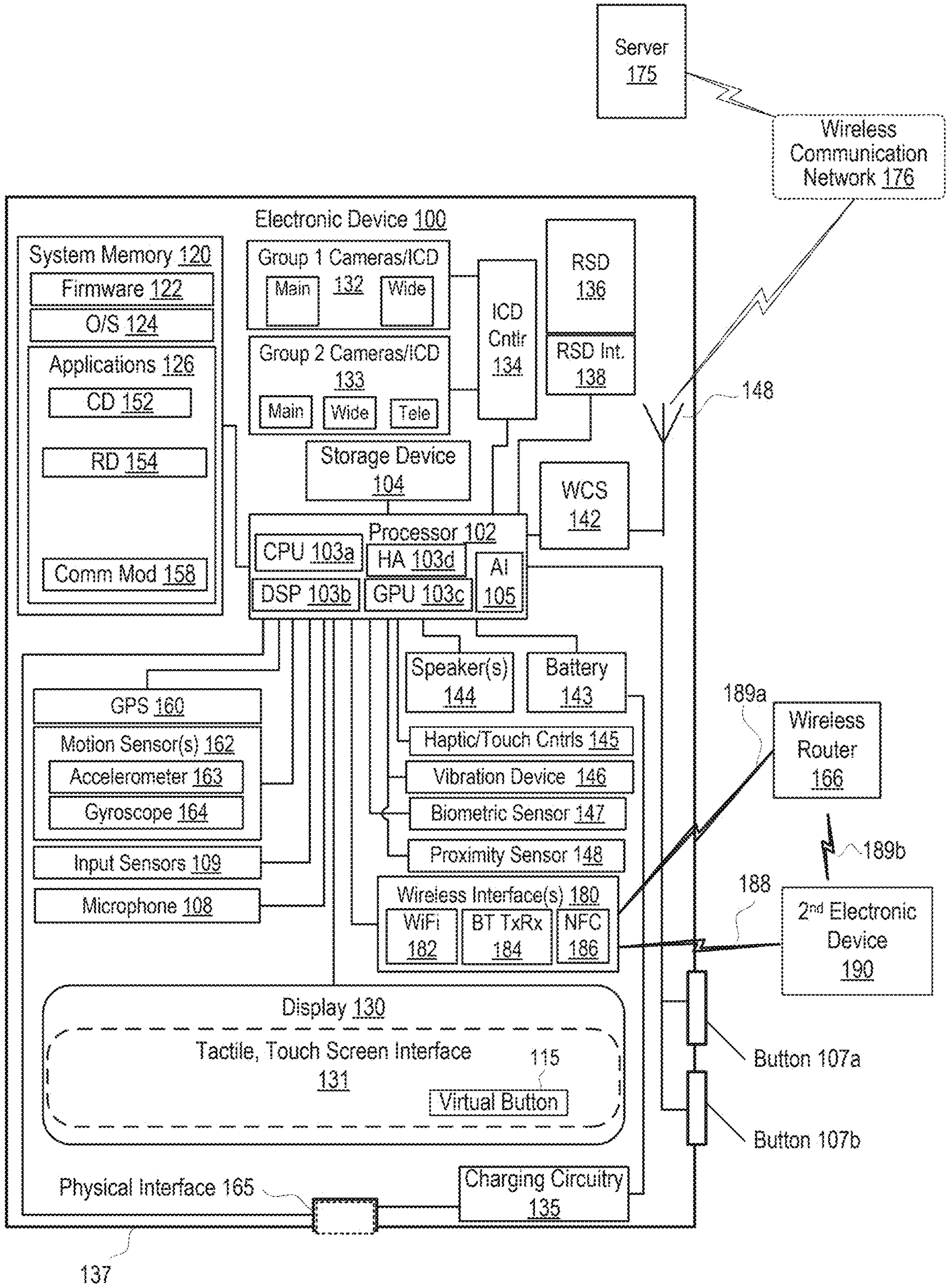
FIG. 1 depicts an example component makeup of an electronic device with specific components that enable the device to implement prevention of accidental copy-paste action, according to one or more embodiments.

According to aspects of the present disclosure, an electronic device, a method, and a computer program product provide techniques for preventing accidental copy-paste actions. Accidentally pasting data into the wrong window on a computer system can lead to a range of problems and pitfalls. Incorrect copy-paste actions can affect both personal privacy and professional work. Pasting sensitive data like passwords, personal identification numbers, financial information, or private messages into a public or unintended window can lead to a privacy breach. Additionally, personal or confidential business information might be inadvertently shared with unauthorized individuals, leading to data leaks. Pasting content that is irrelevant or incorrect for the current context can cause confusion. For example, pasting a private chat message into a professional email could be inappropriate and unprofessional. Moreover, incorrect information shared in the wrong context can lead to miscommunication and misunderstandings. Security risks are also present with copy-paste actions. For example, pasting login credentials into a non-secure application or chat can potentially expose them to malicious actors. Furthermore, pasting personal or inappropriate content in a professional setting can cause embarrassment and discomfort. Thus, mistakenly pasting data into the wrong window can have significant negative consequences, ranging from privacy breaches and security risks to professional repercussions and productivity loss.

The disclosed embodiments alleviate the aforementioned issues that can occur when copying (or cutting) and pasting data. A context for a source of data, and a destination for the data is obtained. The context can include personal or professional, among other contexts. One or more embodiments obtain metadata from a source application window and/or a destination application window. The metadata can include a list of contacts (usernames) associated with a window, such as a communication window (email application, chat application, etc.). One or more embodiments may utilize artificial intelligence (AI) techniques for entity detection, subject/topic detection, sentiment analysis, and/or other attributes to make a determination and/or prediction as to whether pasted content is being pasted in the wrong application window. If a determination and/or prediction of an incorrect paste destination is detected, disclosed embodiments render a context conflict alert. The context conflict alert notifies a user that the paste may be erroneous. The context conflict alert can provide an option to cancel the paste, or to proceed with the paste if the user chooses to do so. Accordingly, disclosed embodiments serve to reduce the risk of an accidental copy-paste action causing information to be sent to incorrect destinations.

One or more embodiments can include an electronic device including: at least one output device, including a display; at least one input device that enables/facilitates selection, copying, and pasting of content; a memory having stored thereon a context detection (CD) module and a recipient detection (RD) module; and at least one processor communicatively coupled to the display and the memory, the at least one processor executing program code of the CD module and RD module, and is configured to cause the electronic device to: obtain content selected via the at least one input device from an application window that is rendered on the display; determine a source context from the selected content and/or the application; detect a paste operation that inserts the selected content into a communication window rendered on the display; determine a destination context, based at least in part on one or more participants/addressees in the communication window; identify a conflict between the source context and the destination context; and in response to identifying the conflict: suspending a transmit option for forwarding the selected content via the communication window; and render a context conflict alert on the display.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, and configuring the electronic device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure. Throughout this disclosure, the terms 'electronic device', 'communication device', and 'electronic communication device' may be used interchangeably, and may refer to devices such as smartphones, tablet computers, and/or other computing/communication devices.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of electronic device 100, within which various aspects of the disclosure can be implemented, according to one or more embodiments. Electronic device 100 includes specific components that enable the device to prevent accidental copy-paste actions, according to one or more embodiments. Examples of electronic device 100 include, but are not limited to, mobile devices, a notebook computer, a mobile phone, a smart phone, a digital camera with enhanced processing capabilities, a smart watch, a tablet computer, and other types of electronic device.

Electronic device 100 includes processor 102 (typically as a part of a processor integrated circuit (IC) chip), which includes processor resources such as central processing unit (CPU) 103*a*, communication signal processing resources such as digital signal processor (DSP) 103*b*, graphics processing unit (GPU) 103*c*, and hardware acceleration (HA) unit 103*d*. In some embodiments, the hardware acceleration (HA) unit 103*d* may establish direct memory access (DMA) sessions to route network traffic to various elements within electronic device 100 without direct involvement from processor 102 and/or operating system 124. Processor 102 can interchangeably be referred to as controller 102.

Processor 102 can, in some embodiments, include image signal processors (ISPs) (not shown) and dedicated artificial intelligence (AI) engines 105. In one or more embodiments, processor 102 can execute AI modules to provide AI functionality of AI engines 105. AI modules may include an artificial neural network, a decision tree, a support vector machine, Hidden Markov model, linear regression, logistic regression, Bayesian networks, and so forth. The AI modules can be individually trained to perform specific tasks and can be arranged in different sets of AI modules to generate different types of output. Processor 102 is communicatively coupled to storage device 104, system memory 120, input devices (introduced below), output devices, including integrated display 130, and image capture device (ICD) controller 134.

For simplicity in describing the features of the electronic device 100, the functionality provided by one or more of CPU 103*a*, DSP 103*b*, GPU 103*c*, and ICD controller 134 are collectively described as being performed by processor 102. Collectively, components integrated within processor 102 support computing, classifying, processing, transmitting and receiving of data and information, and presenting of graphical images within a display.

System memory 120 may be a combination of volatile and non-volatile memory, such as random-access memory (RAM) and read-only memory (ROM). System memory 120 can store program code or similar data associated with firmware 122, an operating system 124, and/or applications 126. During device operation, processor 102 processes program code of the various applications, modules, OS, and firmware, that are stored in system memory 120.

In accordance with one or more embodiments, applications 126 include, without limitation, context detection (CD) module 152, recipient detection (RD) module 154, and communication module 158. Other applications may also be present. Each module and/or application provides program instructions/code that are processed by processor 102 to cause processor 102 and/or other components of electronic device 100 to perform specific operations, as described herein. For example, context detection module 152 and recipient detection module 154 can include program instructions for implementing features of the disclosed embodiments. The context detection module 152 can include instructions that cause or configure processor 102 to detect a context for copied (or cut) content. Similarly, the recipient detection module 154 can include instructions that cause or configure processor 102 to detect context information regarding a destination (recipient) of pasted content. Descriptive names assigned to these modules add no functionality and are provided solely to identify the underlying features performed by processing the different modules.

ICD controller 134 can perform image acquisition functions in response to commands received from processor 102 in order to control group 1 ICDs 132 and group 2 ICDs 133 to capture video or still images of a local scene within a FOV of the operating/active ICD. In one or more embodiments, group 1 ICDs can be front-facing, and group 2 ICDs can be rear-facing, or vice versa. Throughout the disclosure, the term image capturing device (ICD) is utilized interchangeably to be synonymous with and/or refer to any one of the cameras 132, 133. Both sets of cameras 132, 133 include image sensors that can capture images that are within the field of view (FOV) of the respective camera 132, 133.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103*c*, and certain aspects of device communication via wireless networks are performed by DSP 103*b*, with support from CPU 103*a*. In one or more embodiments, electronic device 100 includes removable storage device (RSD) 136, which is inserted into RSD interface 138 that is communicatively coupled via system interlink to processor 102. In one or more embodiments, RSD 136 is a non-transitory computer program product or computer readable storage device encoded with program code and corresponding data, and RSD 136 can be interchangeably referred to as a non-transitory computer program product. RSD 136 may have a version of one or more applications stored thereon. Processor 102 can access RSD 136 to provision electronic device 100 with program code that, when executed/processed by processor 102, the program code causes or configures processor 102 and/or generally electronic device 100, to provide the various functions described herein.

Electronic device 100 includes an integrated display 130 which incorporates a tactile, touch screen interface 131 that can receive user tactile/touch input. As a touch screen device, integrated display 130 allows a user to provide input to or to control electronic device 100 by touching features within the user interface presented on display 130. Tactile, touch screen interface 131 can be utilized as an input device. The touch screen interface 131 can include one or more virtual buttons, indicated generally as 115. In one or more embodiments, when a user applies a finger or stylus on the touch screen interface 131 in the region demarked by the virtual button 115, the touch of the region causes the processor 102 to execute code to implement a function associated with the virtual button. In some implementations, integrated display 130 is integrated into a front surface of electronic device 100 along with front ICDs, while the higher quality ICDs are located on a rear surface. Other embodiments provide for multiple integrated displays within electronic device 100 and references to integrated display 130 are assumed to refer to one or all of these multiple integrated displays.

Electronic device 100 can further include microphone 108, one or more output devices such as speakers 144, and one or more input buttons, indicated as 107*a* and 107*b*. While two buttons are shown in FIG. 1, other embodiments may have more or fewer input buttons. Microphone 108 can also be referred to as an audio input device. In some embodiments, microphone 108 may be used for identifying a user via voiceprint, voice recognition, and/or other suitable techniques. Input buttons 107*a* and 107*b* may provide controls for volume, power, and ICDs 132, 133. Additionally, electronic device 100 can include input sensors 109 (e.g., sensors enabling gesture detection by a user).

Electronic device 100 further includes haptic touch controls 145, vibration device 146, fingerprint/biometric sensor 147, global positioning system (GPS) module 160, and motion sensor(s) 162. Vibration device 146 can cause electronic device 100 to vibrate or shake when activated. Vibration device 146 can be activated during an incoming call or message in order to provide an alert or notification to a user of electronic device 100. According to one aspect of the disclosure, vibration device 146 can be triggered to vibrate when a copy-paste action is determined to be pasting the copied content into an incorrect transmission window. In one or more embodiments, integrated display 130, speakers 144, and vibration device 146 can generally and collectively be referred to as output devices.

Biometric sensor 147 can be used to read/receive biometric data, such as fingerprints, to identify or authenticate a user. In some embodiments, the biometric sensor 147 can supplement an ICD (camera), which provides facial recognition for user detection/identification.

GPS module 160 can provide time data and location data about the physical location of electronic device 100 using geospatial input received from GPS satellites. Motion sensor(s) 162 can include one or more accelerometers 163 and gyroscope 164. Motion sensor(s) 162 can detect movement of electronic device 100 and provide motion data to processor 102 indicating the spatial orientation and movement of electronic device 100. Accelerometers 163 measure linear acceleration of movement of electronic device 100 in multiple axes (X, Y and Z). Gyroscope 164 measures rotation or angular rotational velocity of electronic device 100. Electronic device 100 further includes a housing 137 (generally represented by the thick exterior rectangle) that contains/protects the components internal to electronic device 100.

Electronic device 100 also includes a physical interface 165. Physical interface 165 of electronic device 100 can serve as a data port and can be used as a power supply port that is coupled to charging circuitry 135 and device battery 143 to enable recharging of device battery 143 and/or powering of device.

Electronic device 100 further includes wireless communication subsystem (WCS) 142, which can represent one or more front end devices (not shown) that are each coupled to one or more antennas 148. In one or more embodiments, WCS 142 can include a communication module with one or more baseband processors or digital signal processors, one or more modems, and a radio frequency (RF) front end having one or more transmitters and one or more receivers. Example communication module 158 within system memory 120 enables electronic device 100 to communicate with wireless communication network 176 and with other devices, such as server 175 and other connected devices, such as second electronic device 190. via one or more of data, audio, text, and video communications. Communication module 158 can support various communication sessions by electronic device 100, such as audio communication sessions, video communication sessions, text communication sessions, exchange of data, and/or a combined audio/text/video/data communication session.

WCS 142 and antennas 148 allow electronic device 100 to communicate wirelessly with wireless communication network 176 via transmissions of communication signals to and from network communication devices, such as base stations or cellular nodes, of wireless communication network 176. Wireless communication network 176 further allows electronic device 100 to wirelessly communicate with server 175, and other communication devices, such as second electronic device 190, which can be similarly connected to wireless communication network 176. In one or more embodiments, various functions that are being performed on communications device 100 can be supported using or completed via/on server 175.

Electronic device 100 can also wirelessly communicate, via short-range wireless interface(s) 180, with second electronic device 190 and/or wireless communication network 176 via communication signals 188 (communicating between wireless interface(s) 180 and second electronic device 190), 189*a* (communicating between wireless interface(s) 180 and wireless router 166), and/or 189*b* (communicating between wireless router 166 and second electronic device 190). In one or more embodiments, signals 188 and/or signals 189*a* may be transmitted by short range communication device(s) within wireless interface(s) 180. Wireless interface(s) 180 can include short-range wireless communication adapters/transceivers, such as wireless fidelity (Wi-Fi) transceiver 182 for Wi-Fi connectivity, Bluetooth transceiver 182, and near field communication (NFC) transceiver 186. In one or more embodiments, electronic device 100 can receive Internet or Wi-Fi based calls, text messages, multimedia messages, and other notifications via wireless interface(s) 180. In one or more embodiments, electronic device 100 can communicate wirelessly with external wireless devices, such as a WiFi router 166 or second electronic device 190, via one or more of wireless interface(s) 180. In one or more embodiments, WCS 142 with antenna(s) 148 and wireless interface(s) 180 collectively provide/represent a wireless communications subsystem of electronic device 100.

Electronic device 100 of FIG. 1 is only a specific example of a device that can be used to implement the embodiments of the present disclosure. Devices that utilize aspects of the disclosed embodiments can include, but are not limited to, a smartphone, a tablet computer, a laptop computer, a desktop computer, a wearable computer, and/or other suitable electronic device.

Figure 2A:
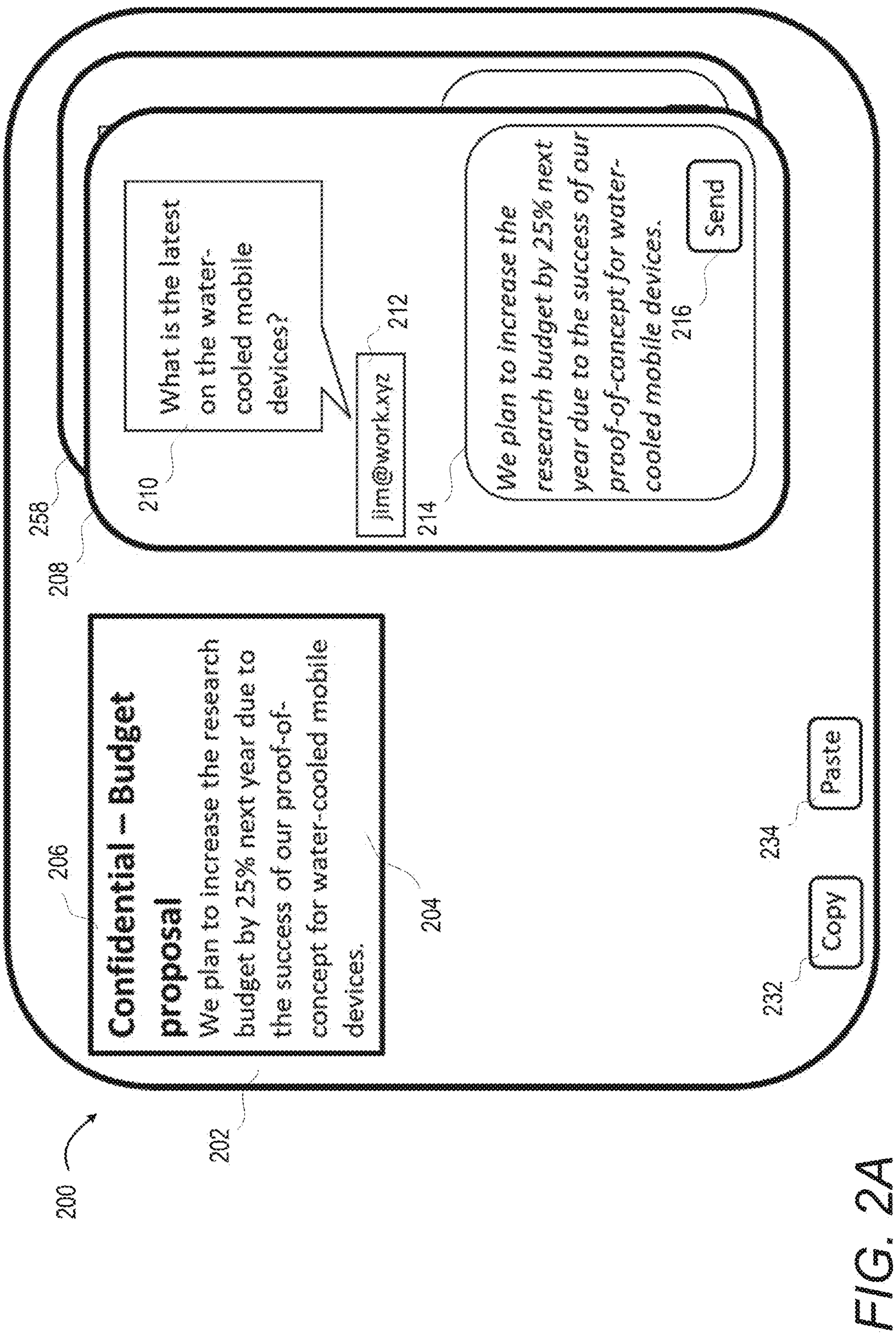
FIG. 2A is an example screen view for an electronic device with multiple applications present, according to one or more embodiments.

FIG. 2A is an example screen view for an electronic device with multiple applications present, according to one or more embodiments. In one or more embodiments, the screen view 200 shown in FIG. 2A may be rendered on a display 202 of a device such as device 100 of FIG. 1. The screen view 200 includes text application 204 which contains text, including title 206 which shows: "Confidential-Budget proposal." Additionally, the screen view 200 includes a multi-windowed communication application, including first window 208 and second window 258. As illustrated in FIG. 2A, first window 208 is in focus while second window 258 is not in focus; Accordingly, first window 208 is rendered "on top of" second window 258. First window 208 contains a communication 210 with a user indicated at 212 as jim@work.xyz. FIG. 2A shows a user's intention to copy content from an application window and paste that copied content into a message entry area of the first communication window, which the user intends to be transmitted to a second user. As shown, the user copied text from application 204 and pasted the copied text into outgoing content window 214, and the user then intends to press the send button 216, which would cause the content in outgoing content window 214 to be sent to recipient(s) associated with the first window 208. In embodiments, the user may select content via a user input device such as a keyboard and/or mouse, and/or via some touchscreen operations such as taps, double taps, swipes, and the like. Once the content is selected, a user may invoke the copy button 232 to copy the selected content to a temporary memory (i.e., clipboard). The user may then indicate a destination by selecting a destination window (e.g., window 214), and then invoke the paste button 234 to paste the selected content that is stored in the temporary memory (i.e., clipboard) to the destination window. In one or more embodiments, instead of, or in addition to, copy button 232 and paste button 234, other techniques (e.g., keyboard shortcuts Ctrl-C, and Ctrl-V) may be used for copying and pasting of content.

Figure 2B:
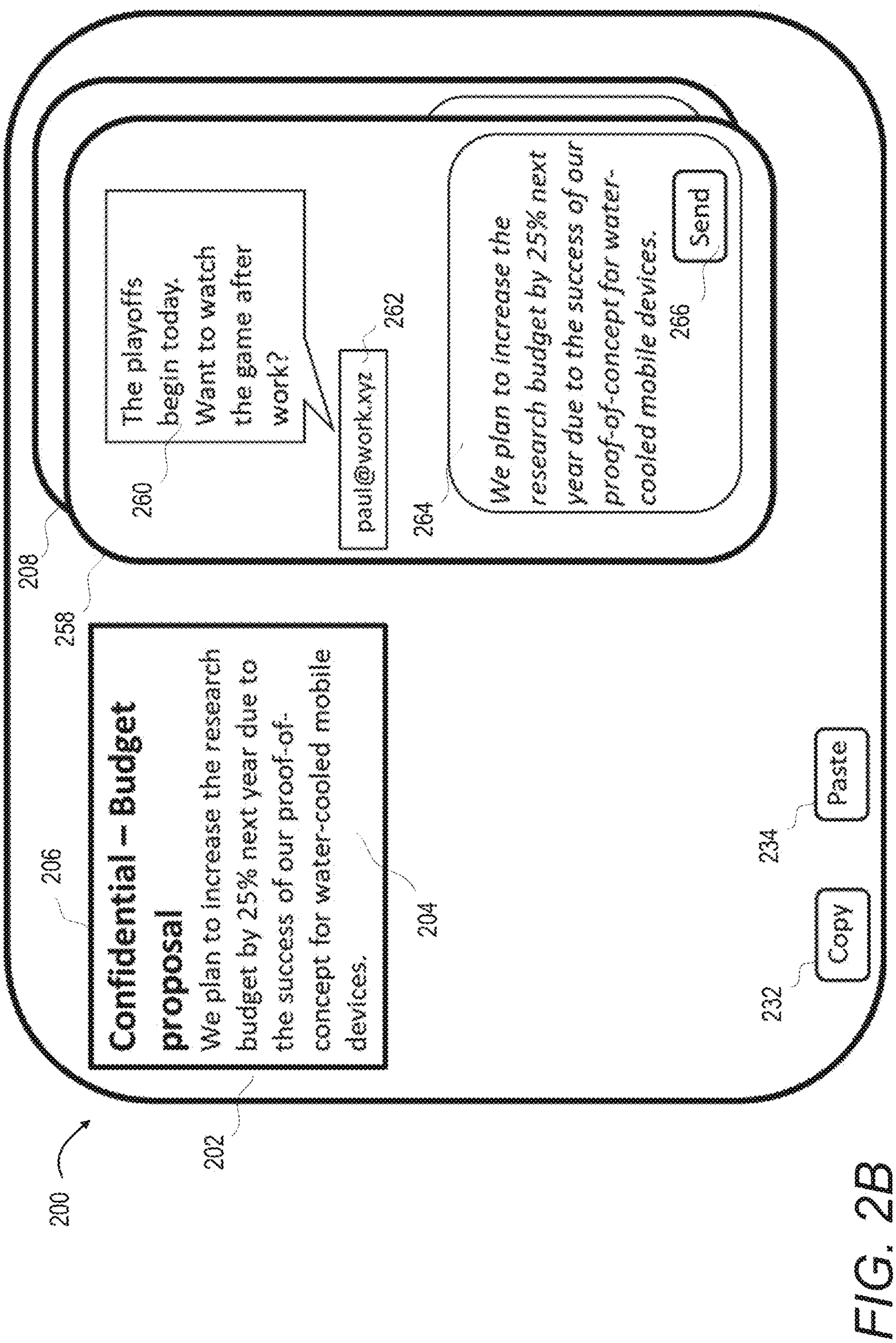
FIG. 2B continues the example from FIG. 2A, showing a focus change for one of the multiple applications, according to one or more embodiments.

FIG. 2B is an alternate outcome from the example from FIG. 2A, showing a focus change for one of the multiple applications, according to one or more embodiments. As shown in FIG. 2B, instead of pasting to window 208 as shown in FIG. 2A, in FIG. 2B, before the user could paste the content from 204, the focus of the multi-windowed communication application changed, such that second window 258 is now in focus, and first window 208 is no longer in focus. The change in focus can be caused by asynchronous/unsolicited activity, such as the device receiving communication 260 issued by another user indicated at 262 as paul@work.xyz, where the communication 260 is presented via surfacing of second window 258, which is not related to the communication in first window 208. One or more embodiments can include determining a destination context, based at least in part on one or more participants in the communication window. The asynchronous/unsolicited change in focus can create a situation where a user might accidentally paste content in outgoing content window 264 that was intended for the window 208 as shown in FIG. 2A. If the user presses the send button 266, incorrect information, and potentially confidential information can be sent to an incorrect recipient. One or more embodiments can include identifying a conflict between the source context and the destination context by detecting a focus change for the communication window. In one or more embodiments, the detection of the focus change can be accomplished by the operating system using hooks, callbacks, and/or other event-based constructs. In one or more embodiments, an application issues an event when it loses or gains focus. In one or more embodiments, instructions within the context detection module 152 cause the processor to listen for focus change events and/or other asynchronous/unsolicited events that can cause a change in focus for one or more applications.

Figure 2C:
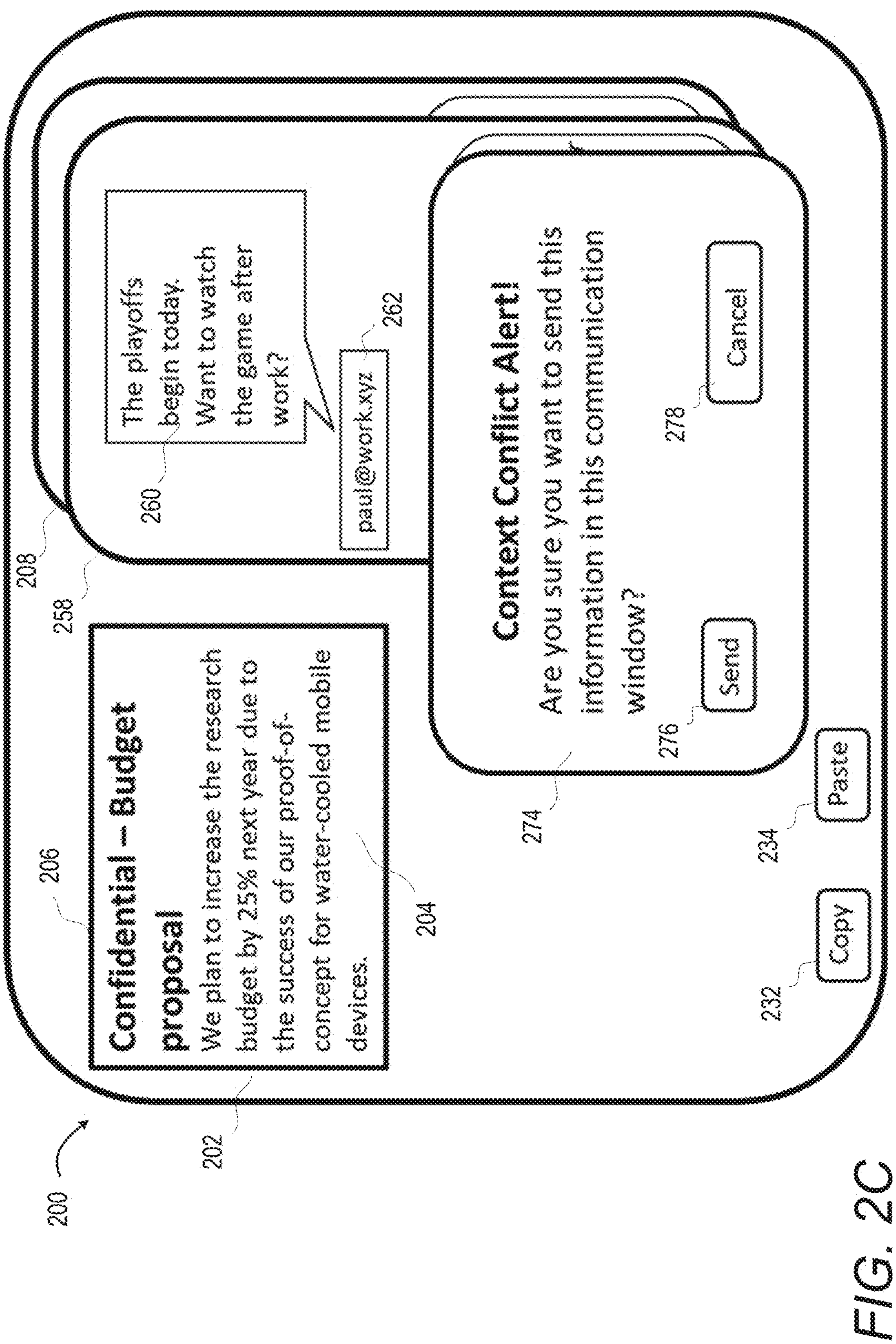
FIG. 2C continues the example from FIG. 2B, showing a context conflict alert, according to one or more embodiments.

FIG. 2C continues the example from FIG. 2B, showing presentation of a context conflict alert, according to one or more embodiments. In one or more embodiments, a focus change is detected for the multi-windowed communication application. Additionally, context information from the source content in text application 204 may be inferred, using techniques such as natural language processing (NLP). For example, words such as 'confidential' and 'budget' in the title 206 may indicate a subject of a budget, and additionally indicate sensitive content. Similarly, the communication 260 contains words such as "playoffs" and "game" which can indicate a topic unrelated to budgets. In one or more embodiments, upon detecting a context conflict between a source context (e.g., a budget topic), and a destination context (e.g., watching sports), a context conflict alert 274 is rendered. The context conflict alert 274 can serve to trigger suspension of a transmit option for forwarding the selected content via the communication window, such as by implementing a modal dialog that forces acknowledgement prior to performing other actions. In one or more embodiments, the context conflict alert 274 can include a send button 276 that enables a user to send/accept the paste action. The send button 276 can be used when the user intended to make the copy-paste action. In one or more embodiments, the context conflict alert 274 can include a cancel button 278 that enables a user to reject/cancel the paste action. The cancel button 278 can be used when the user did not intend to make the copy-paste action.

Figure 2D:
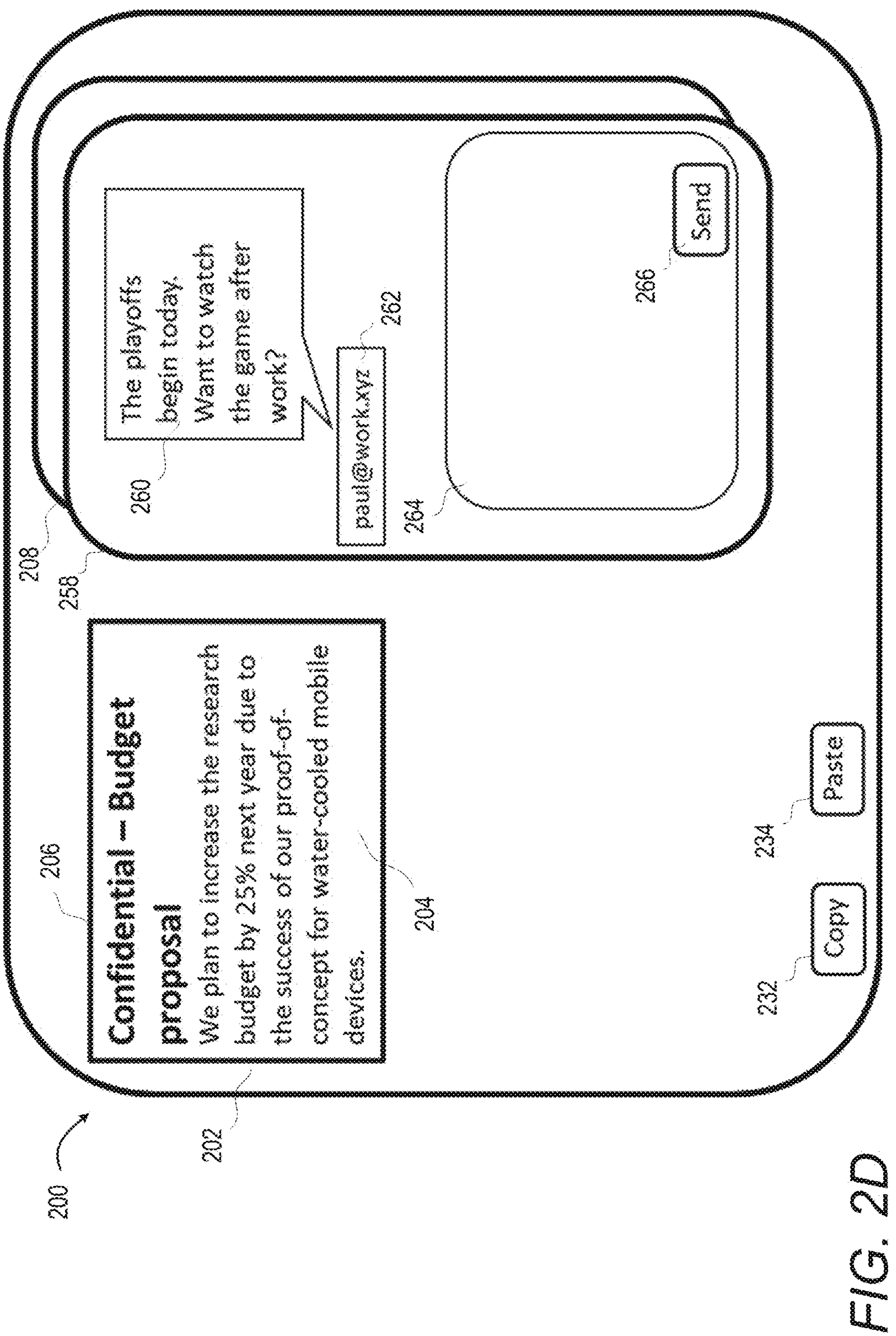
FIG. 2D continues the example from FIG. 2C, showing the result of a user response to the context conflict alert, according to one or more embodiments.

FIG. 2D continues the example from FIG. 2C, showing the result of a user response to the context conflict alert. In the example shown in FIG. 2D, the user invoked the cancel button 278 (FIG. 2C). In one or more embodiments, as a result, the pasted content (shown in FIG. 2B) is removed from window 264. Accordingly, disclosed embodiments can prevent an accidental copy-paste action based on comparison of a source context and a destination context.

Figure 3A:
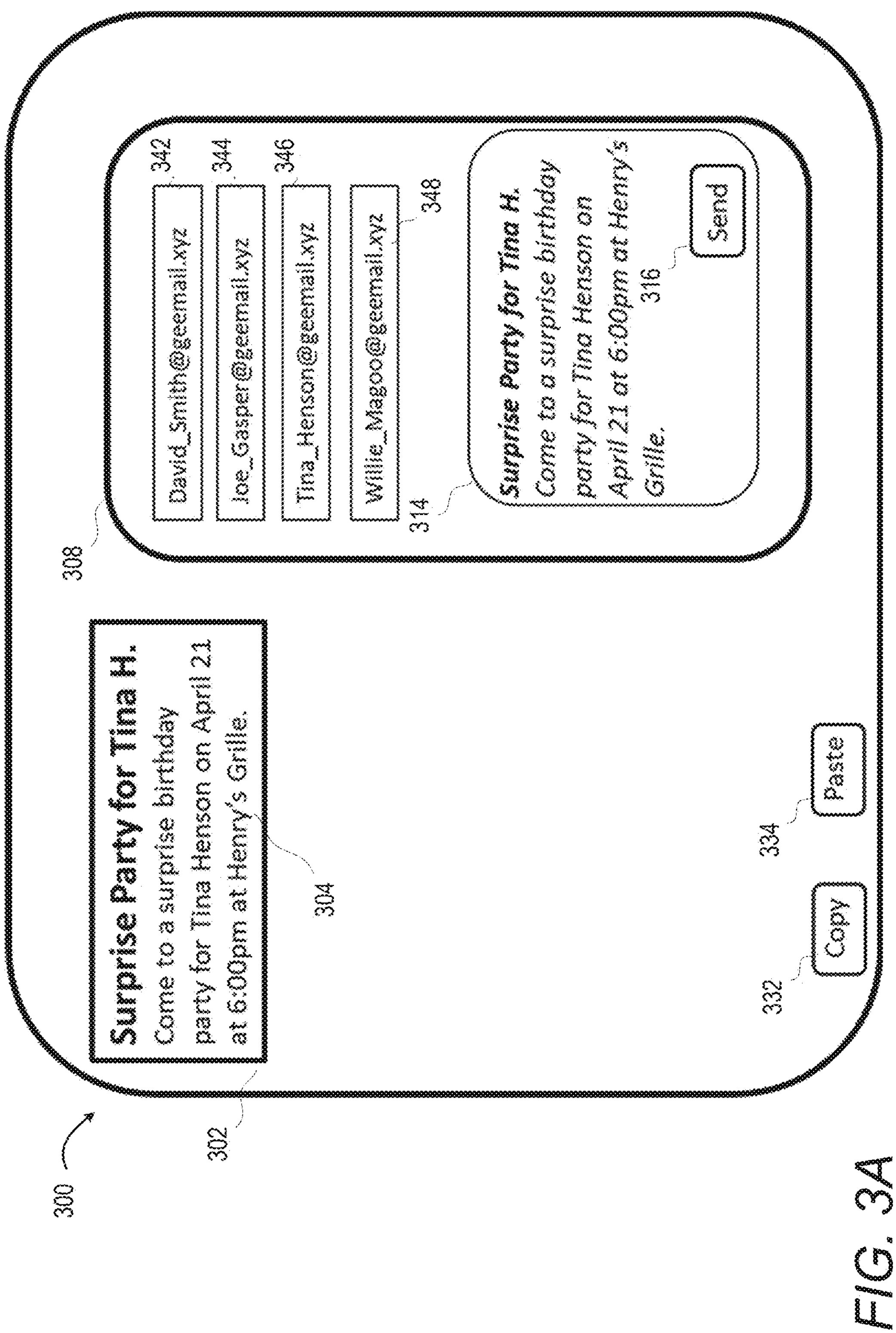
FIG. 3A is another example screen view for an electronic device with multiple applications present, showing pasting of content into a communication window associated with multiple user identifiers, according to one or more embodiments.

FIG. 3A is another example screen view for an electronic device with multiple applications present, showing pasting of content into a communication window associated with multiple user identifiers, according to one or more embodiments. In one or more embodiments, the screen view 300 shown in FIG. 3A may be rendered on a display 302 of a device such as device 100 of FIG. 1. The screen view 300 includes text application 304 which contains text, including information regarding a surprise birthday party. In particular, the text states: "Come to a surprise birthday party for Tina Henson on April 21 at 6:00 pm at Henry's Grille." Additionally, the screen view 300 includes a communication application that includes communication window 308. The communication window 308 includes communication with multiple recipients, with corresponding associated user identifiers indicated at 342, 344, 346, and 348. In particular, the user identifier indicated at 346 is associated with the name 'Tina Henson,' which is also a subject of the content in the text shown in text application 304. FIG. 3A shows a user's current action, in which case, the user copied the text from application 304 and pasted the text into outgoing content window 314, and plans to press the send button 316, which would cause the content in outgoing content window 314 to be sent to recipient(s) associated with the window 308. The copy button 332 and paste button 334 operate as previously described for copy button 232 and paste button 234 shown in FIG. 2A.

Figure 3B:
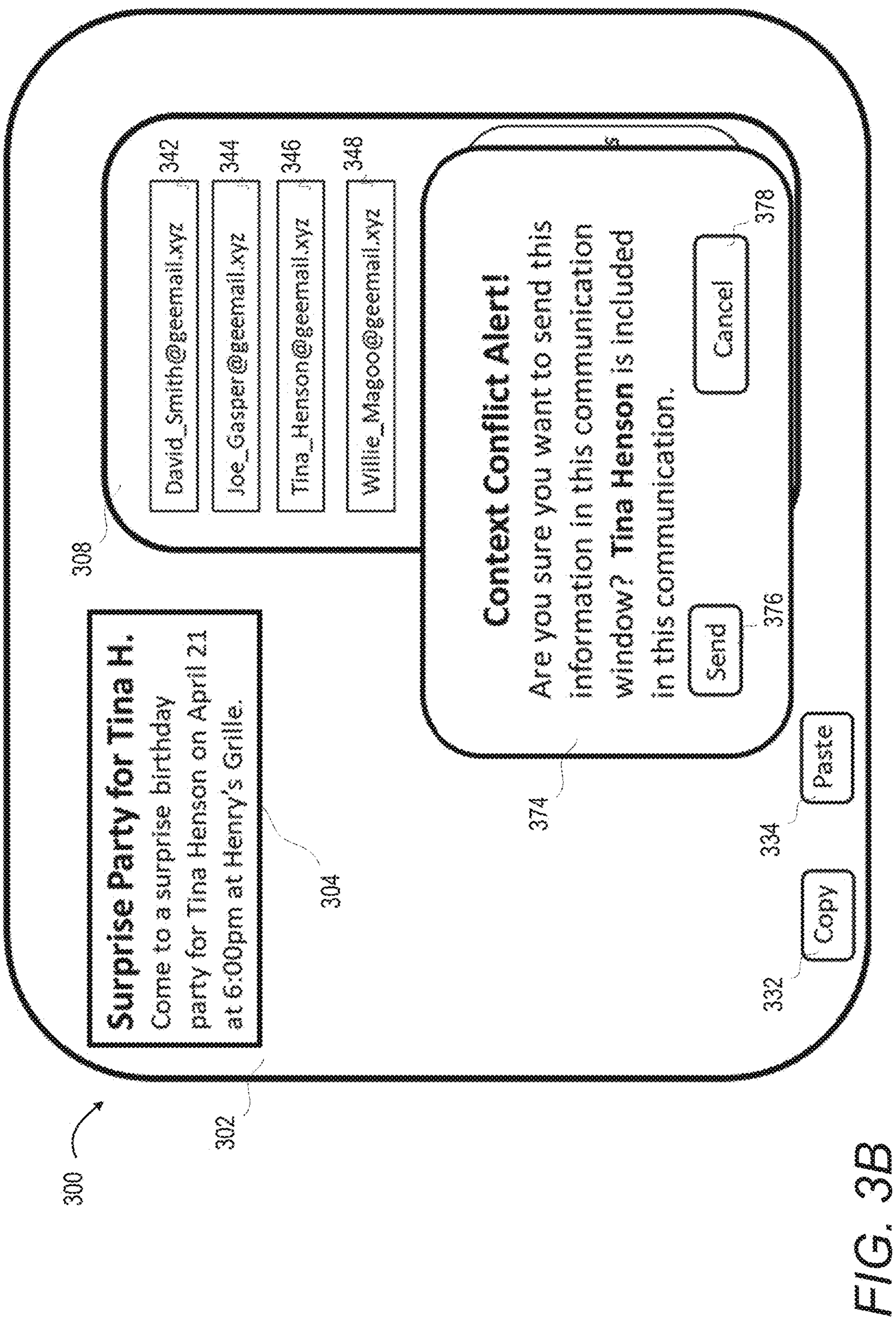
FIG. 3B continues the example from FIG. 3A, showing a context conflict alert based on user identifiers, according to one or more embodiments.

FIG. 3B continues the example from FIG. 3A, showing a context conflict alert based on user identifiers, according to one or more embodiments. In one or more embodiments, natural language processing is performed to determine a subject person and a subject topic of the communication. In response to detecting that the subject topic is a surprise party, and that the subject person (the person the party is for) is Tina Henson, and further, that the group communication includes a user identifier (indicated at 346) that includes Tina Henson, disclosed embodiments can render and present a context conflict alert 374. As can be seen in FIG. 3B, the context conflict alert 374 can include a reason for issuing the alert. In this case, the reason is indicated that Tina Henson is included in this communication. Thus, disclosed embodiments can detect that a person that is the subject of a surprise is included in group communication and preemptively render and present a context conflict alert to prevent unintended ruining of the surprise element of a planned event (e.g., birthday party). Similar to as described for FIG. 2C, the send button 376 can be used when the user intends to make or to proceed with the copy-paste action and cancel button 378 can be used when the user does not intend to make or proceed with the copy-paste action.

Figure 3C:
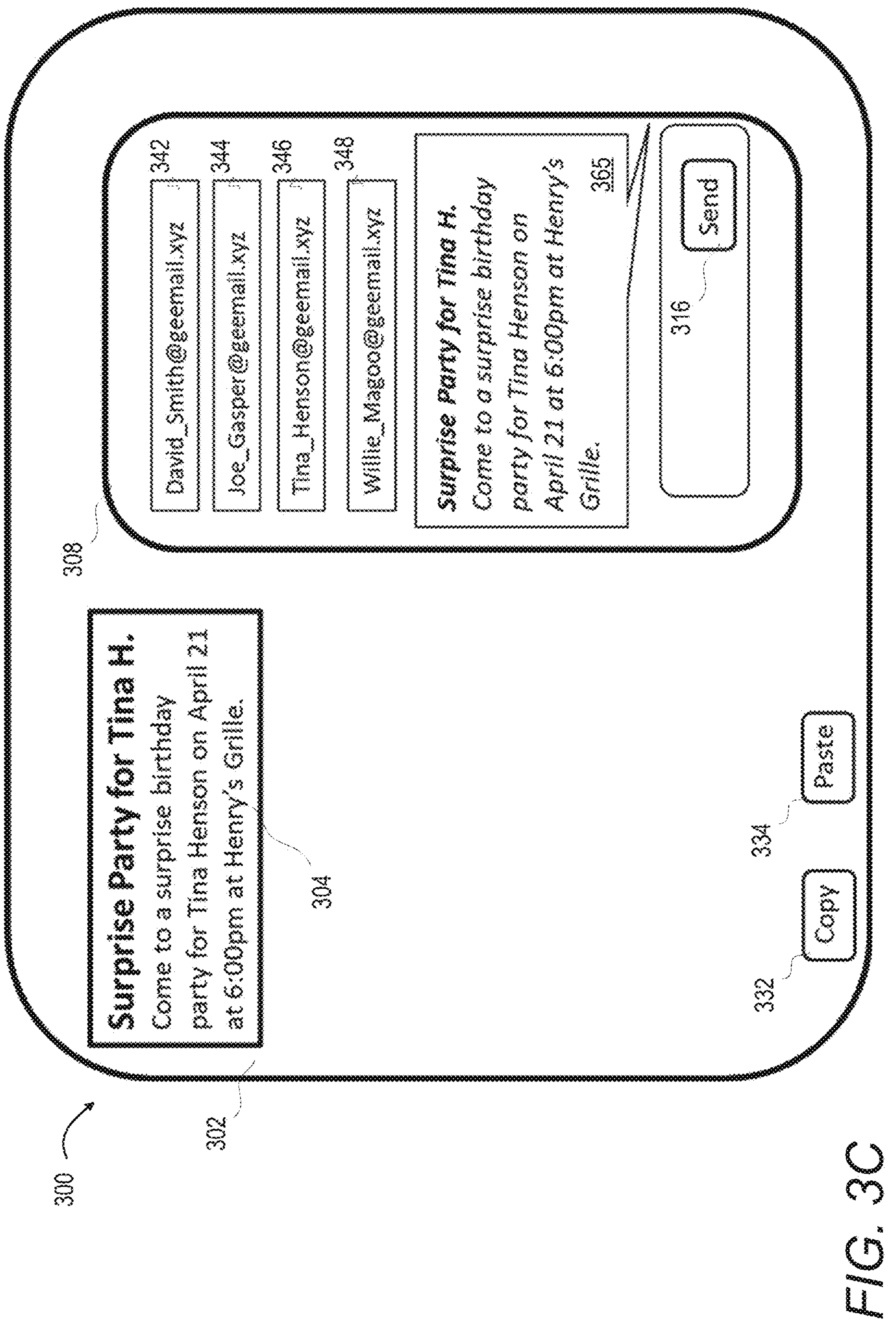
FIG. 3C continues the example from FIG. 3B, showing the result of a user response to the context conflict alert, according to one or more embodiments.

FIG. 3C continues the example from FIG. 3B, showing the result of a user response to the context conflict alert. In the example shown in FIG. 3C, the user invoked the send button 376 (FIG. 3B). Accordingly, as shown at 365, the communication is sent to the group chat. As an example, if the subject person is named Tina Henson, and the user identifier 346 corresponds to her mother, who is also named Tina Henson, then the send button 376 provided by disclosed embodiments enable a user to override the context conflict alert recommendation/warning and send/enter the pasted content.

Figure 4A:
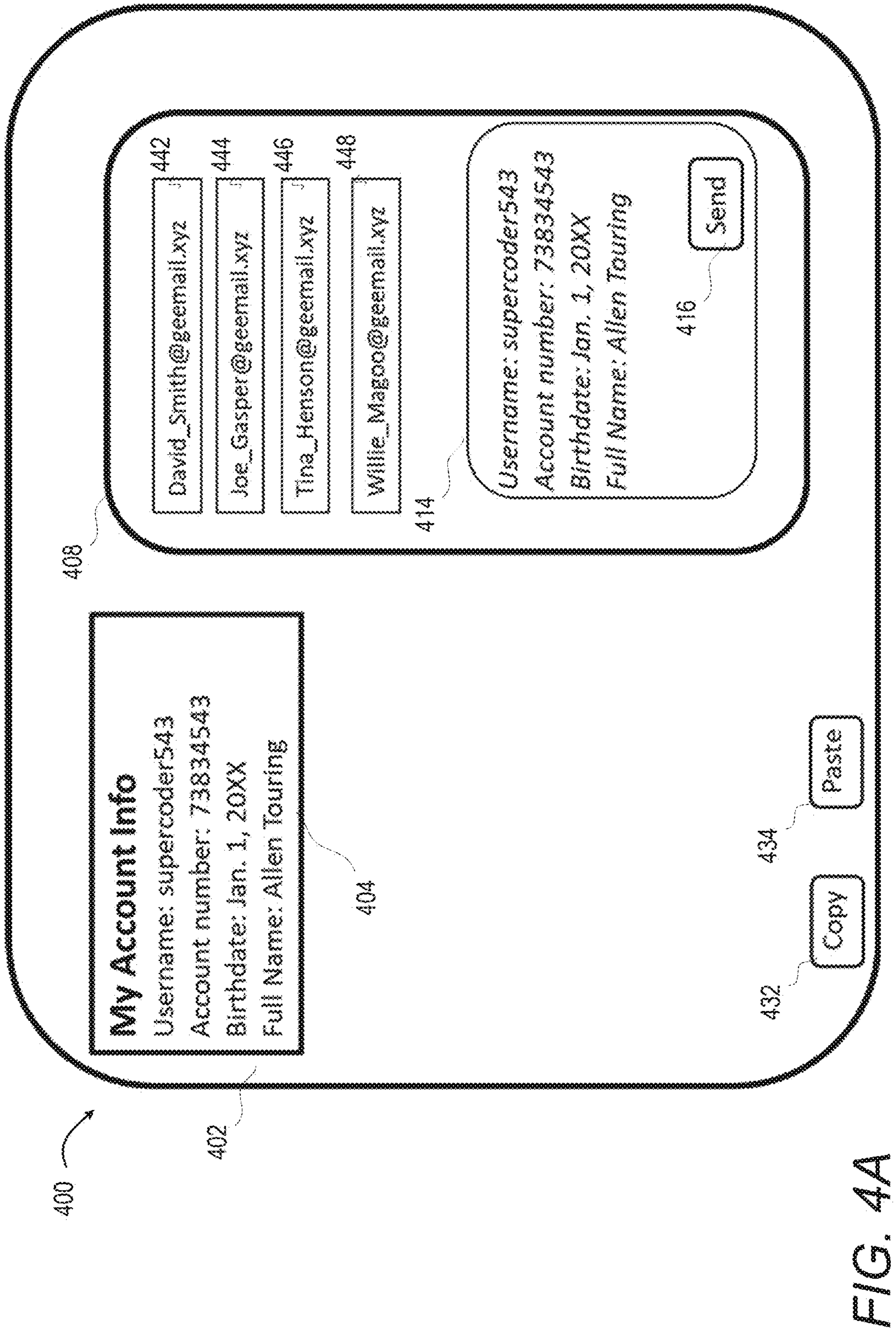
FIG. 4A is another example screen view for an electronic device with multiple applications present, showing pasting of content into a communication window associated with multiple user identifiers, according to one or more embodiments.

FIG. 4A is another example screen view for an electronic device with multiple applications present, showing pasting of content into a communication window associated with multiple user identifiers, according to one or more embodiments. In one or more embodiments, the screen view 400 shown in FIG. 4A may be rendered on a display 402 of a device such as device 100 of FIG. 1. The screen view 400 includes text application 404 which contains text, including information such as a username, account number, birthdate, and full name. Additionally, the screen view 400 includes a communication application that includes communication window 408. The communication window 408 includes communication with multiple recipients, with corresponding associated user identifiers indicated at 442, 444, 446, and 448. FIG. 4A shows a user's intention, in which case, the user copied the text from application 404 and pasted the text into outgoing content window 414, and plans to press the send button 416, which would cause the content in outgoing content window 414 to be sent to recipient(s) associated with window 408. The copy button 432 and paste button 434 operate as previously described for copy button 232 and paste button 234 shown in FIG. 2A.

Figure 4B:
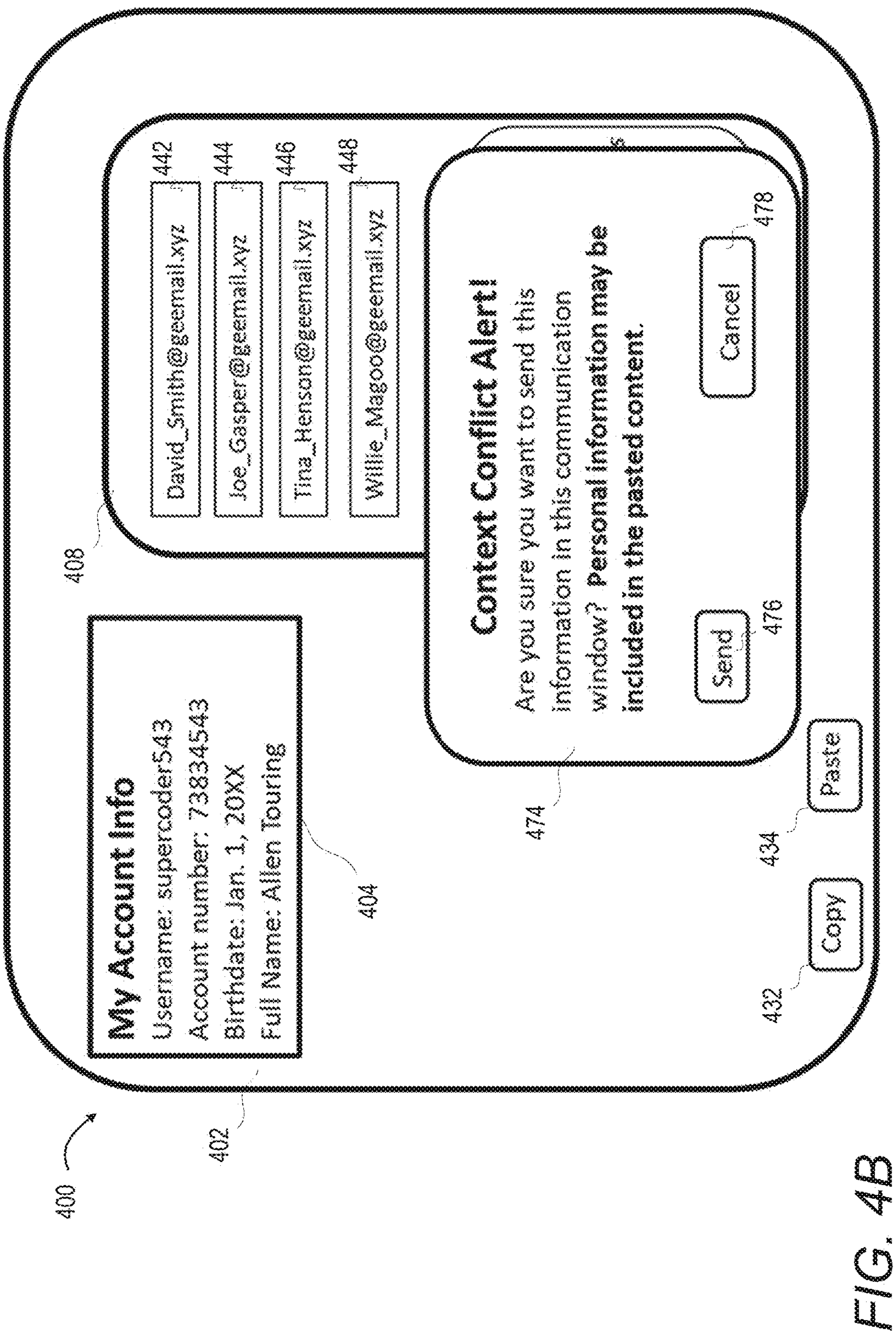
FIG. 4B continues the example from FIG. 4A, showing a context conflict alert based on personally identifiable information, according to one or more embodiments.

FIG. 4B continues the example from FIG. 4A, showing a context conflict alert based on personally identifiable information, according to one or more embodiments. In one or more embodiments, natural language processing is performed to determine that one or more pieces of potentially personally identifiable information (PII) may be present. PII can include any information that can be used to identify an individual, either on its own or when combined with other information. In the example of FIG. 4B, the full name, username, and account number, along with a partial birthdate, can be used to identify and potentially locate or impersonate an individual. In response to detecting the presence of potentially personally identifiable information (PII), disclosed embodiments can render and present a context conflict alert 474. The send button 476 and cancel button 478 operate as previously described for send button 276 and cancel button 278 shown in FIG. 2C. As can be seen in FIG. 4B, the context conflict alert 474 can include a reason for issuing the alert. In this case, the reason is indicated that PII information may be included in the pasted content (shown in window 414 of FIG. 4A). Accordingly, disclosed embodiments can prevent an accidental copy-paste operation that includes PII. One or more embodiments can include: identifying text within the selected content; detecting personally identifiable information (PII) within the identified text; and establishing a source context as PII based on the detected PII. In one or more embodiments, detecting personally identifiable information (PII) within the identified text comprises detecting at least one PII from a group comprising an email address, telephone number, full name, social security number, passport number, and account number.

Figure 5A:
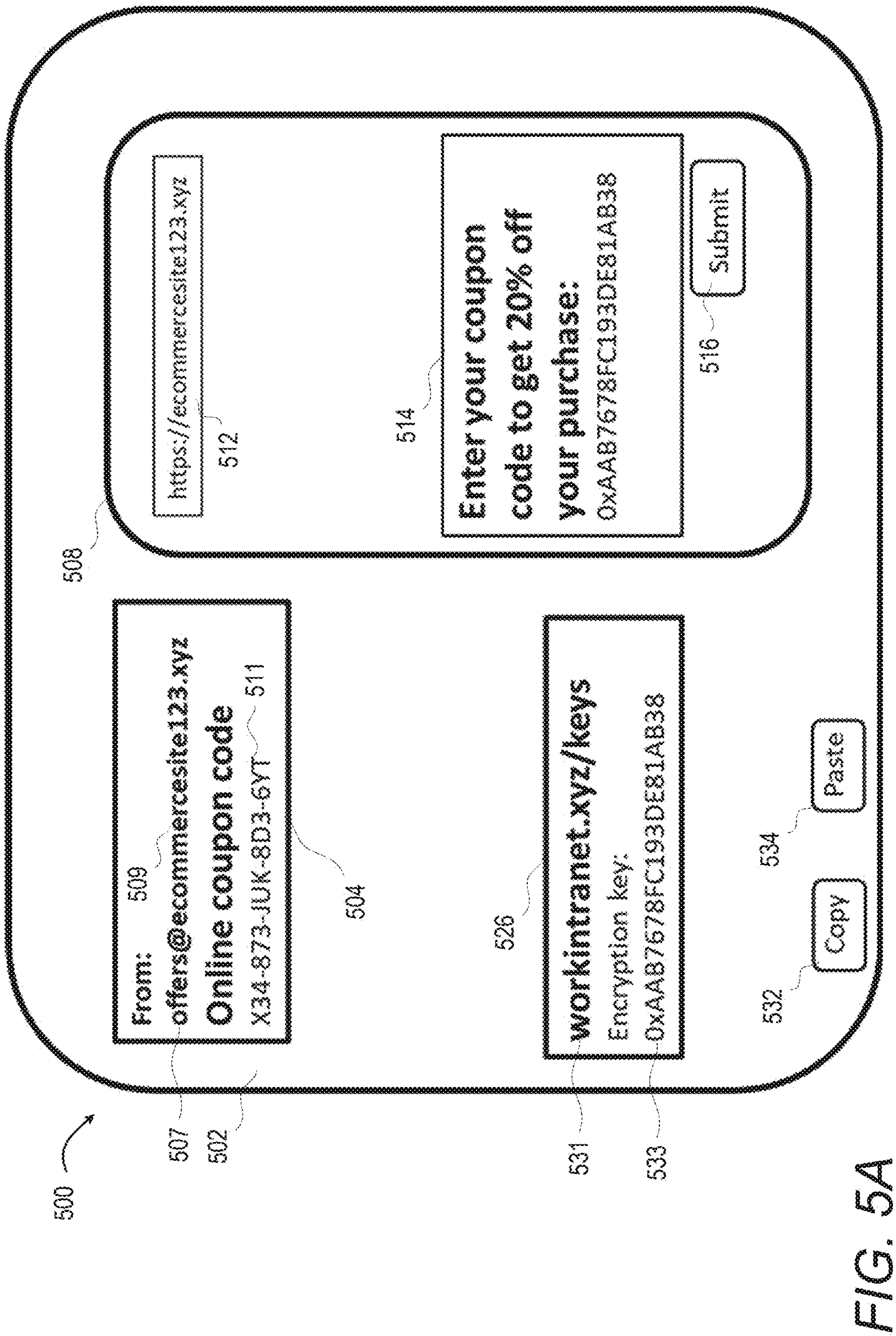
FIG. 5A is another example screen view for an electronic device with multiple applications present, showing pasting of content into a communication window associated with a uniform resource locator, according to one or more embodiments.

FIG. 5A is another example screen view for an electronic device with multiple applications present, showing pasting of content into a communication window associated with a uniform resource locator, according to one or more embodiments. In one or more embodiments, the screen view 500 shown in FIG. 5A may be rendered on a display 502 of a device such as device 100 of FIG. 1. The screen view 500 includes email communication application 504 which contains an email that shows a sender address 507, which includes a sender domain 509. Additionally, the email includes an online coupon code, indicated at 511. The screen view 500 further includes a web browser application window 526 that includes content, including a source URL (uniform resource locator) 531, and a hexadecimal value representing an encryption key, indicated at 533. The screen view 500 further includes another browser application window 508 that includes a URL 512, and a content window 514 where it is requested to enter the coupon code indicated at 511. The code can then be submitted by invoking the submit button 516. However, as depicted in FIG. 5A, the user has inadvertently copied the encryption key, indicated at 533, into the content window 514.

Figure 5B:
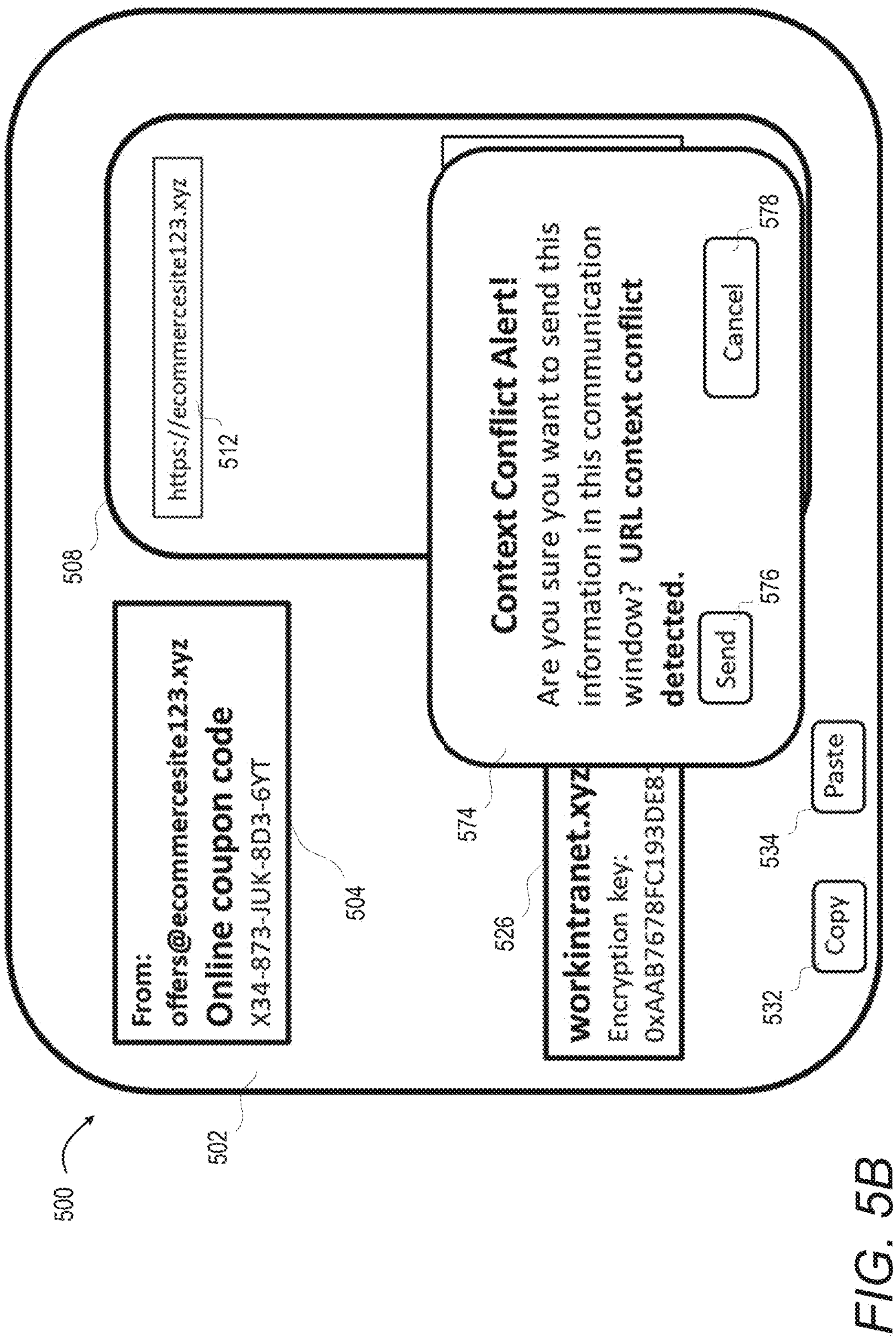
FIG. 5B continues the example from FIG. 5A, showing a context conflict alert based on a uniform resource locator, according to one or more embodiments.

FIG. 5B continues the example from FIG. 5A, showing a context conflict alert based on a uniform resource locator, according to one or more embodiments. In one or more embodiments, a URL associated with a source window (where content is copied or cut from), and a URL associated with a destination window (where content is copied to) are compared as part of a determination of whether a potential context conflict has occurred. In one or more embodiments, if a first context associated with the domain name of the source URL and a second context associated with the domain name of the destination URL do not match, a context conflict alert is rendered and presented. In the example shown in FIG. 5B, the first context is an ecommerce context (based on the URL indicated at 512), and the second context is a workplace context (based on the URL indicated at 531). As shown in FIG. 5B, the context conflict alert 574 can include a reason for issuing the alert. The send button 576 and cancel button 578 operate as previously described for send button 276 and cancel button 278 shown in FIG. 2C. The copy button 532 and paste button 534 operate as previously described for copy button 232 and paste button 234 shown in FIG. 2A.

In the example shown in FIG. 5B, the reason is indicated as the URL of the source content 531 (workintranet.xyz) does not match the URL 512 associated with the destination (ecommercesite123.xyz). Accordingly, disclosed embodiments can prevent an accidental copy-paste operation when a URL-based context conflict is detected. One or more embodiments can include: identifying a Uniform Resource Locator (URL) associated with the application window; and determining the source context at least in part based on a hostname corresponding to the URL. A hostname of a URL is the part of the URL that specifies the domain name or IP address of the server where the resource is located. Thus, the hostname identifies the host that holds the resource or service being requested.

Figure 6A:
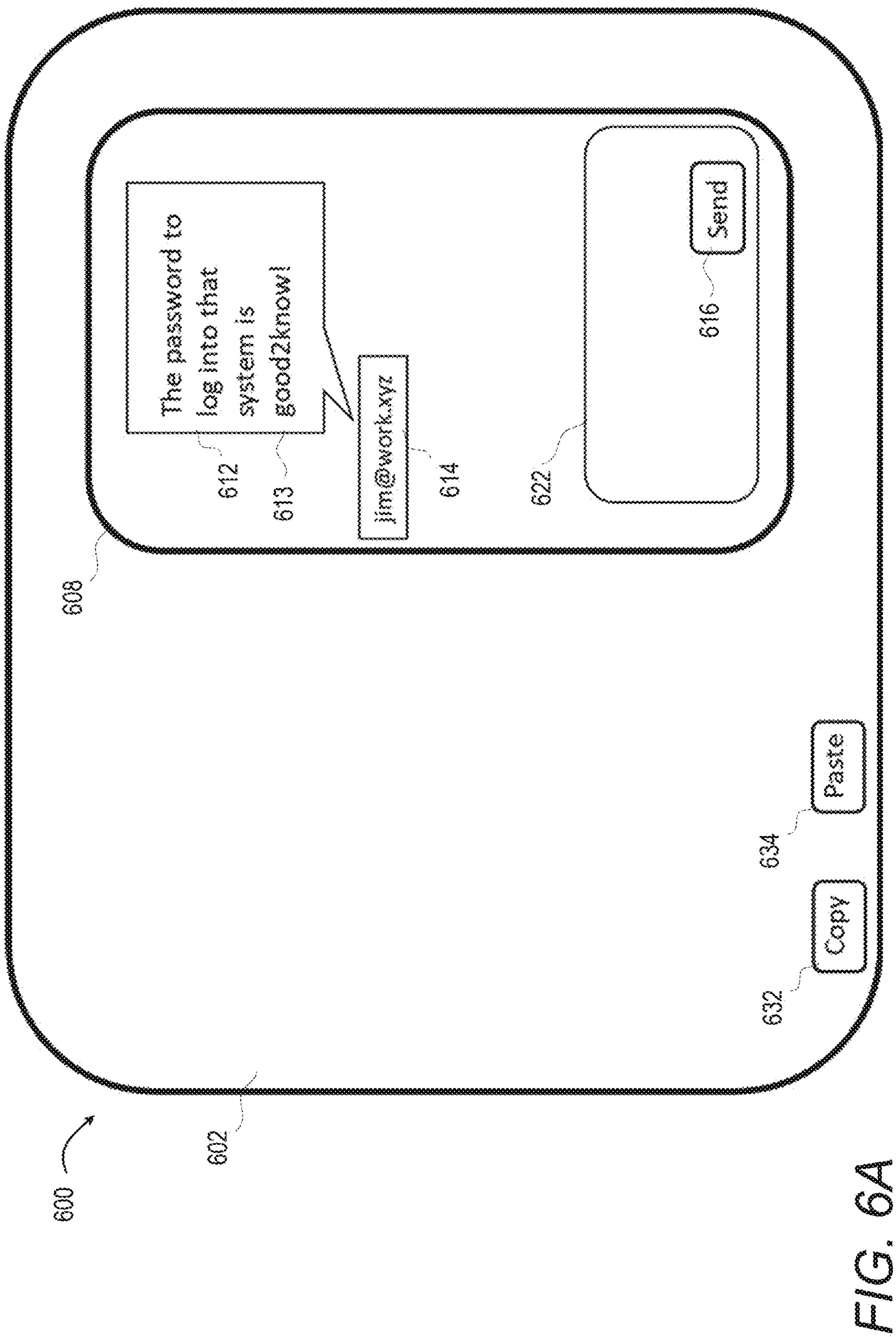
FIG. 6A is another example screen view for an electronic device with multiple applications present, showing copying of content from a communication window, according to one or more embodiments.

FIG. 6A is another example screen view for an electronic device with multiple applications present, showing copying of content from a communication window, according to one or more embodiments. In one or more embodiments, the screen view 600 shown in FIG. 6A may be rendered on a display 602 of a device such as device 100 of FIG. 1. The screen view 600 includes main communication application window 608 which contains a text communication passage indicated at 612 from the user indicated at 614. Outgoing content window 622 is configured to receive content that can be pasted in, and/or entered manually via a keyboard, speech-to-text, and/or other suitable techniques. The text communication indicates a password of 'good2know!' indicated at 613. The copy button 632 and paste button 634 operate as previously described for copy button 232 and paste button 234 shown in FIG. 2A.

Figure 6B:
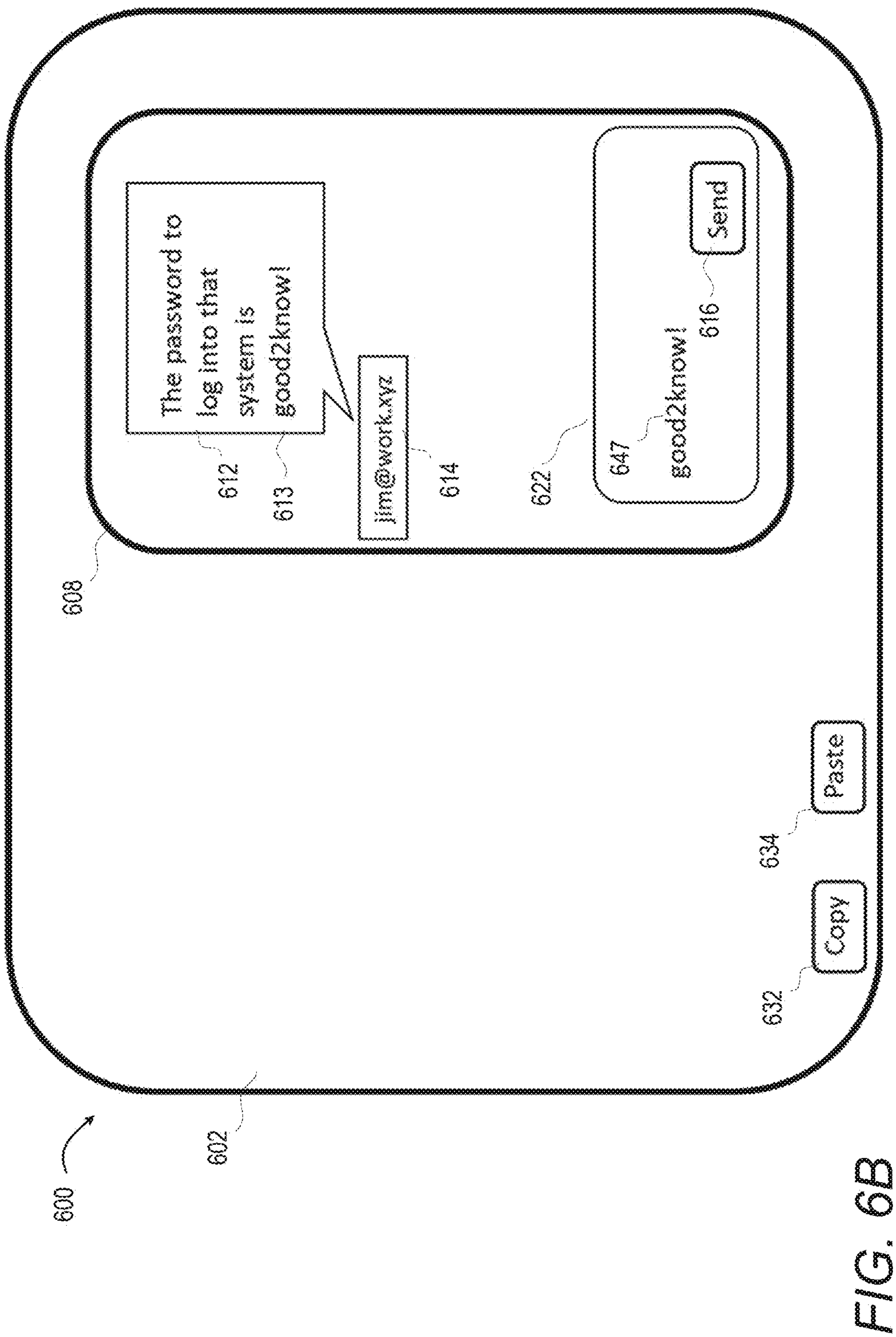
FIG. 6B continues the example from FIG. 6A, showing pasting of the content into the same communication window, according to one or more embodiments.

FIG. 6B continues the example from FIG. 6A, showing pasting of the content into the same communication window (window 608), according to one or more embodiments. As can be seen in FIG. 6B, the user has pasted the password indicated at 613 into outgoing content window 622 (shown as 647), where both window 612 and window 622 are contained within main communication application window 608.

Figure 6C:
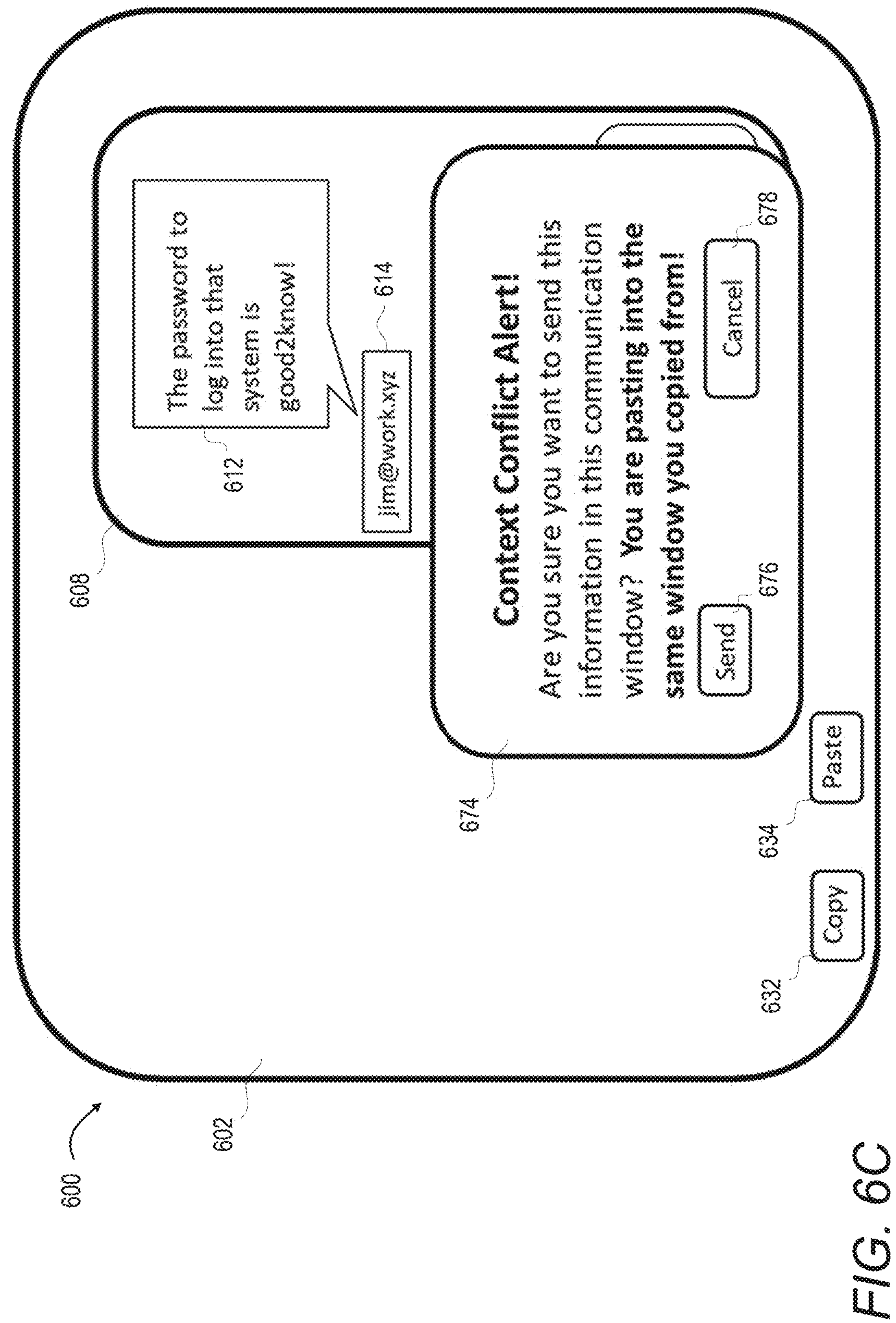
FIG. 6C continues the example from FIG. 6B, showing a context conflict alert based on a source window for copying matching a destination window for pasting, according to one or more embodiments.

FIG. 6C continues the example from FIG. 6B, showing a context conflict alert based on a source window for copying that matches a destination window for pasting, according to one or more embodiments. In one or more embodiments, a source main application window and a destination main application window are compared as part of a determination of whether a potential context conflict has occurred. In one or more embodiments, if the source application window and the destination application window are the same, a context conflict alert is rendered and presented. As shown in FIG. 6C, the context conflict alert 674 can include a reason for issuing the alert. In this case, the reason is indicated that the content was copied from, and pasted into, the same application window (main communication application window 608). The send button 676 and cancel button 678 operate as previously described for send button 276 and cancel button 278 shown in FIG. 2C. Accordingly, disclosed embodiments can detect when the source of a copy (or cut) operation is the same as the paste destination, and render and present a context conflict alert accordingly. In one or more embodiments, identifying a conflict between the source context and the destination context further comprises determining that the source context and the destination context are identical. Thus, in one or more embodiments, to identify a conflict between the source context and the destination context, the at least one processor is further configured to determine that the application window that the selected content originated from is also the communication window that is used as a destination for the paste operation. While the examples shown in FIGS. 2A-6C include pasting of text, one or more embodiments can operate on other types of data, including, but not limited to, images, screenshots, videos, URLs, file attachments, and/or other types of data that can be shared via a communication application.

Figure 7:
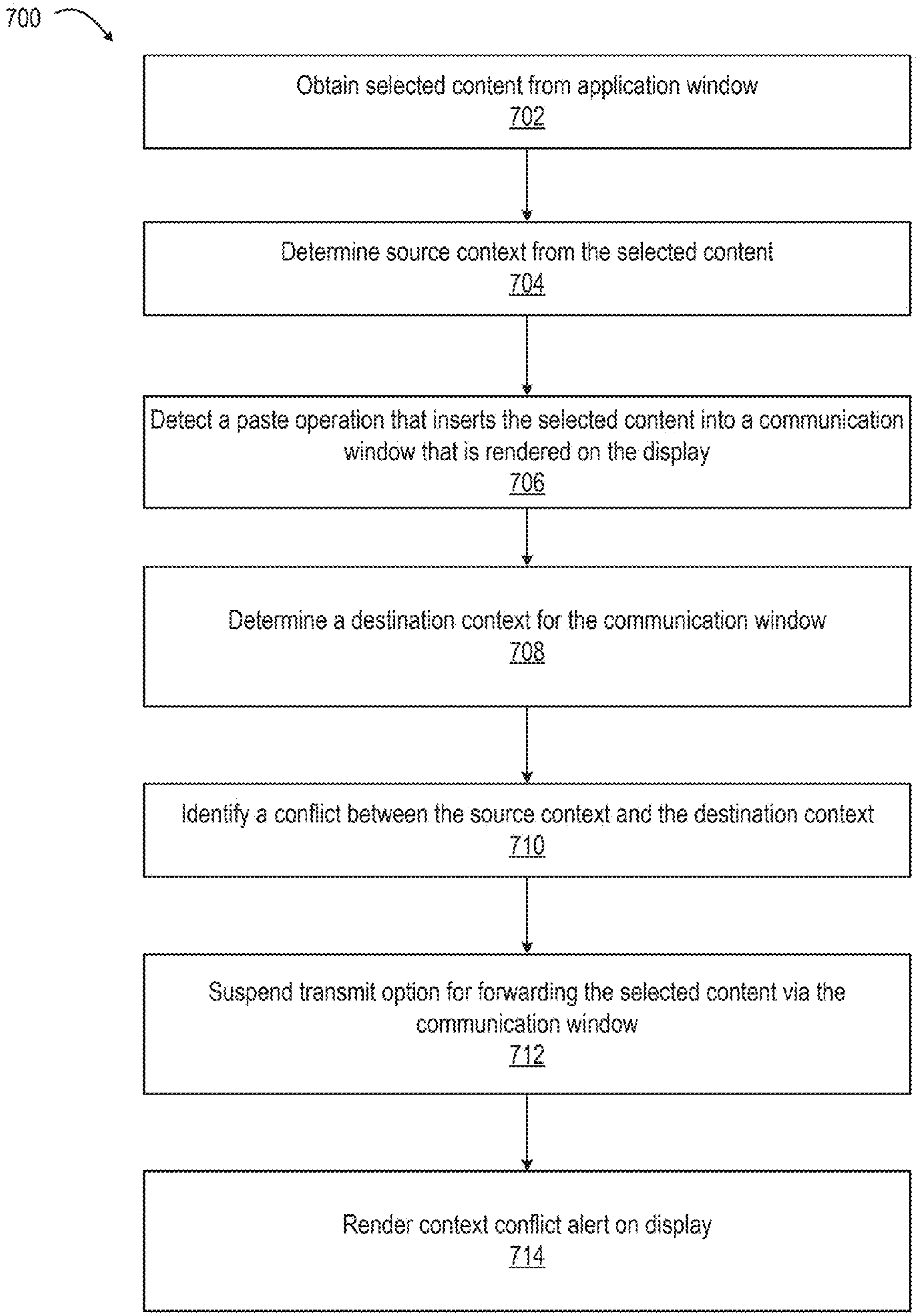
FIG. 7 depicts a flowchart of a computer-implemented method for preventing accidental copy-paste action, according to one or more embodiments.
Figure 8:
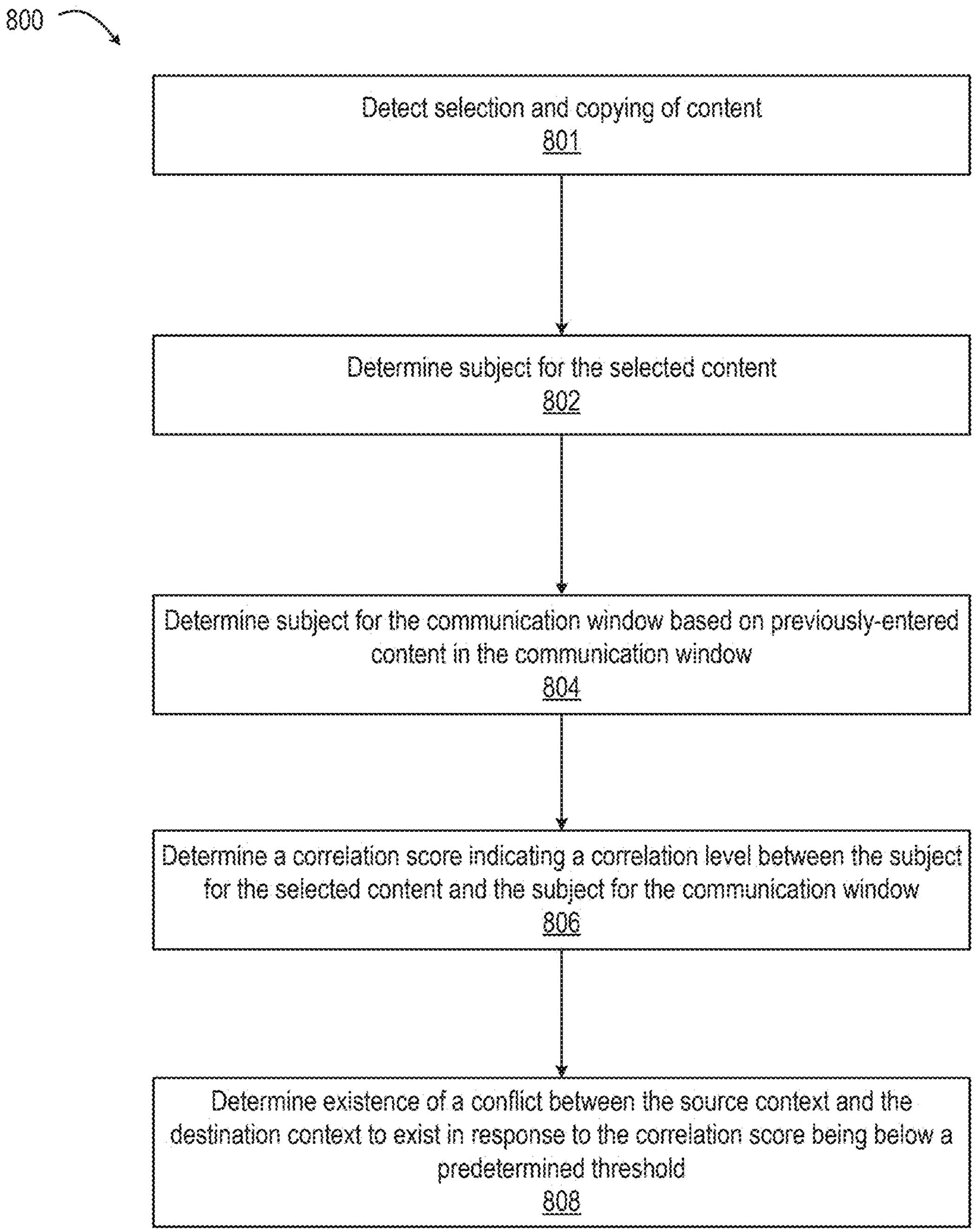
FIG. 8 depicts a flowchart of a computer-implemented method for preventing accidental copy-paste action based on subject detection, according to one or more embodiments.
Figure 9:
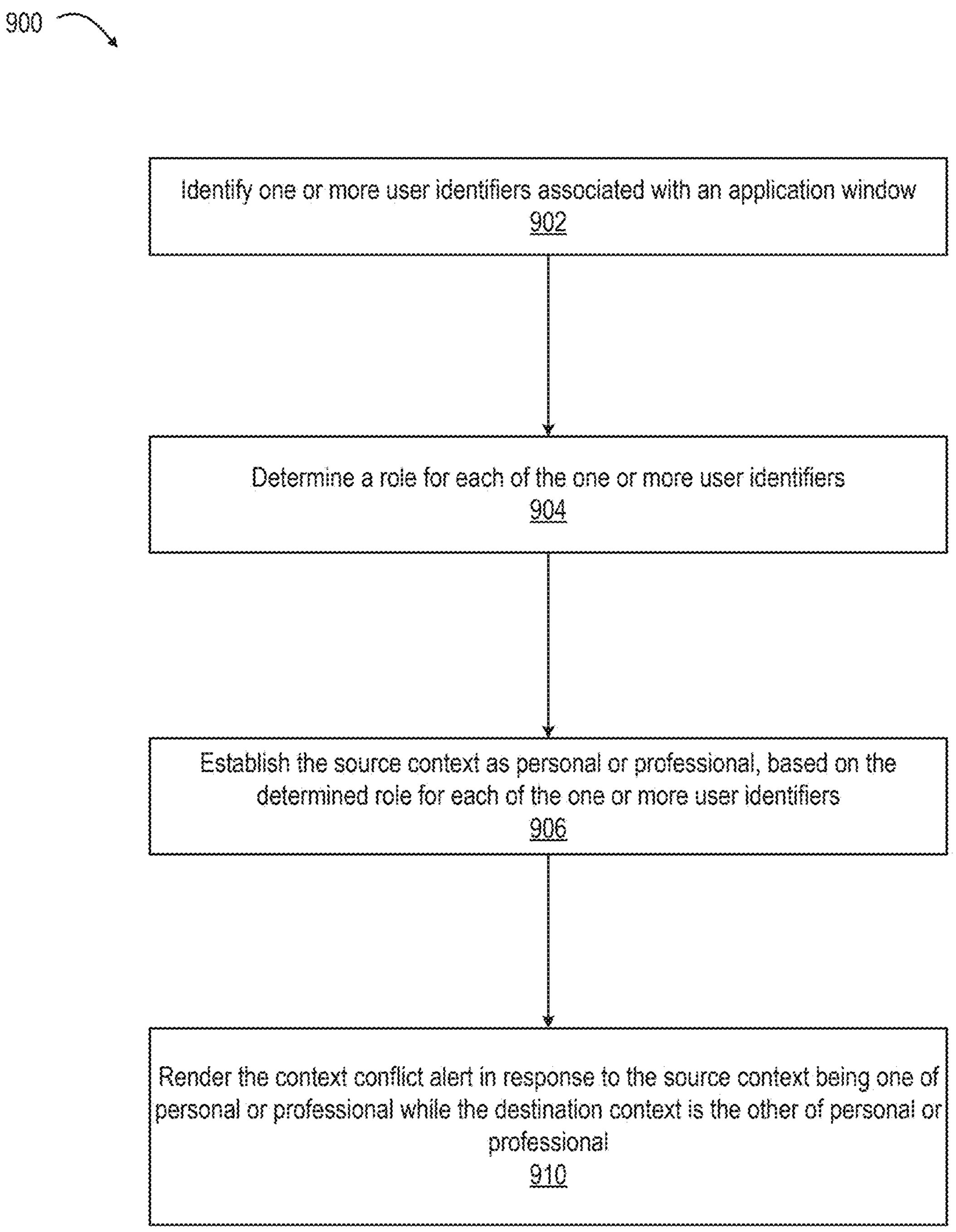
FIG. 9 depicts a flowchart of a computer-implemented method for prevention of accidental copy-paste action based on personal or professional context, according to one or more embodiments.

Referring now to the flowcharts presented by FIG. 7-FIG. 9, the descriptions of the methods in by FIG. 7-FIG. 9 are provided with general reference to the specific components and features illustrated within the preceding FIGS. 1-6C. Specific components referenced in the methods of by FIG. 7-FIG. 9 may be identical or similar to components of the same name used in describing preceding FIGS. 1-6C. In one or more embodiments, processor 102 (FIG. 1) configures electronic device 100 (FIG. 1) to provide the described functionality of the methods of FIG. 7-FIG. 9 by executing program code for one or more modules or applications provided within system memory 120 of electronic device 100, including context detection (CD) module 152, and/or recipient detection (RD) module 154.

FIG. 7 depicts a flowchart of a computer-implemented method for preventing accidental copy-paste action, according to one or more embodiments. The method 700 starts at block 702, where selected content is obtained from an application window. The selection can be performed with a mouse using click and drag operations, or using arrow keys of a keyboard and/or other keyboard shortcuts. On a touch-screen device such as a tablet or smartphone, various tap operations such as tap and hold, double-tap, and/or triple-tap, may be used for selection of content. The method 700 continues with determining a source context from the selected content at block 704. The source context can be based on text included in the selected content, images included in the selected content, a URL associated with the selected content, one or more user identifiers associated with the selected content, and so on. The method 700 continues to block 706 where a paste operation that inserts the selected content into a communication window that is rendered on the display is detected. The method 700 continues to block 708 where a destination context for the communication window is determined. In one or more embodiments, the destination context can be determined based at least in part on a URL associated with a destination window, one or more user identifiers associated with a destination window (e.g., recipients in a group chat), and/or other information. The method 700 continues to block 710, where a potential conflict is identified between the source context and the destination context. In one or more embodiments, the conflict can include a difference in subjects between text in a source application window and text in a destination application window. An example of a difference in subjects between text in a source application window and text in a destination application window is depicted in FIG. 2B, where a source topic pertains to a product development budget (indicated at 204), and a destination topic pertains to watching a playoff game (indicated at 260). In one or more embodiments, the conflict can be based on user identifiers associated with a destination window, and a topic in source content that includes a surprise pertaining to a user associated with one or more of the user identifiers associated with the destination window. An example of a conflict based on user identifiers associated with a destination window and a topic in source content that includes a surprise pertaining to a user associated with one or more of the user identifiers associated with the destination window is depicted in FIG. 3A, where source content (indicated at 304) includes a topic regarding a surprise party for Tina Henson, and a user identifier associated with Tina Henson is associated with the destination window, as indicated at 346. In one or more embodiments, the conflict can be based on detecting pasting of personally identifying information (PII). An example of pasting PII is shown in FIG. 4A, where information from text application 404 is pasted into outgoing content window 414. In one or more embodiments, the conflict can include a difference in a URL associated with a source application window and a URL associated with a destination application window. An example of a difference in URLs between a source application window and a destination application window is depicted in FIG. 5A, where text associated with a source URL indicated at 531 is pasted into an outgoing content window 514, which is associated with the destination URL indicated at 512. In one or more embodiments, the conflict can include detecting copying and pasting in the same application window, such as depicted in FIG. 6B. In one or more embodiments, other criteria may also be used for determining a conflict or potential conflict.

The method 700 continues to block 712, where a transmit option for forwarding the selected content via the communication window is suspended. In one or more embodiments, the suspending of the transmit option may be performed by activating a modal dialog, such as depicted in FIG. 6C, with context conflict alert 674. Other techniques for suspending the transmit option, such as disabling the send button (e.g., 616 of FIG. 6B), may be used in one or more embodiments. The method 700 continues to block 714, where a context conflict alert is rendered, such as depicted at 674 in FIG. 6C. In one or more embodiments, when a suspension of the transmit option is employed, the user is required to override the suspended action in order to transmit the message. Accordingly, any inadvertent copy-paste-send sequence of operations without stopping to read/listen and/or react/respond to the alert can be prevented.

FIG. 8 depicts a flowchart of a computer-implemented method 800 for prevention of accidental copy-paste action based on subject detection, according to one or more embodiments. The method 800 starts with detecting selection and copying of content at block 801 and determining a subject for the selected content at block 802. In one or more embodiments, the subject determination can include natural language processing techniques such as keyword extraction, Term Frequency-Inverse Document Frequency (TF-IDF), frequency analysis of words, Named Entity Recognition (NER), Latent Dirichlet Allocation (LDA), Latent Semantic Analysis (LSA), and/or other suitable techniques. The method 800 continues to block 804 with determining a subject for the communication window. In one or more embodiments, the determining of a subject for the communication window can be based on previously-entered content in the communication window. In one or more embodiments, the determining of a subject for the communication window can be based on an application name for the application that is providing the communication window, a URL associated with the communication window, and/or other suitable techniques. The determination of the subject in the communication window can be performed in a similar manner to as described for block 802. The method 800 continues to block 806 where a correlation score indicating a correlation level between the subject for the selected content and the subject for the communication window is determined. In one or more embodiments, the determination of the correlation score can utilize techniques including cosine similarity, word embeddings, Jaccard similarity, Euclidean distance, Levenshtein Distance, overlap coefficient, BM25 (Best Matching 25), and/or other suitable techniques. The method 800 continues to block 808, where the existence of a conflict is determined between the source context and the destination context to exist in response to the correlation score being below a predetermined threshold. An example of prevention of accidental copy-paste action based on subject detection is depicted in FIGS. 2A-2D, where a subject of a budget proposal indicated at 204 is not highly correlated to a subject of watching playoff games, as indicated at 260. One or more embodiments can include: determining a subject for the selected content; determining a subject for the communication window based on previously-entered content in the communication window; determining a correlation score indicating a correlation level between the subject for the selected content and the subject for the communication window; and determining existence of a conflict between the source context and the destination context to exist in response to the correlation score being below a predetermined threshold.

FIG. 9 depicts a flowchart of a computer-implemented method 900 for preventing accidental copy-paste actions based on personal or professional context, according to one or more embodiments. The method 900 starts at block 902 with identifying one or more user identifiers associated with an application window. In one or more embodiments, the user identifiers can include email addresses and/or chat messaging identifiers for a communication application such as Slack, Teams, WhatsApp, or the like. The method 900 continues to block 904 where a role is determined for each of the one or more user identifiers. In one or more embodiments, the role can be inferred from a portion of the user identifier. As an example, in one or more embodiments, an email address having a corporate domain can be inferred to be a professional contact, while an email address from a personal email account can be inferred to be a personal contact. The method 900 continues with establishing the source context as personal or professional, based on the determined role for each of the one or more user identifiers at block 906. The method 900 continues to block 910, where a context conflict alert is rendered in response to the source context being one of personal or professional while the destination context is the other of personal or professional.

One or more embodiments can include: identifying one or more user identifiers associated with the application window; determining a role for each of the one or more user identifiers; and establishing the source context as personal or professional, based on the determined role for each of the one or more user identifiers. One or more embodiments can further include: identifying one or more user identifiers associated with the communication window; determining a role for each of the one or more user identifiers; establishing a destination context as personal or professional, based on the determined role for each of the one or more user identifiers; and rendering the context conflict alert in response to the source context being one of personal or professional while the destination context is the other of personal or professional.

Additionally, one or more embodiments may utilize natural language processing (NLP) techniques to determine if a text passage from a source application (where text is cut/copied from) and/or a text passage from a destination application (where text is pasted to) is of a professional or personal nature. One or more embodiments can utilize supervised learning techniques with text classification, in which a classifier is trained using labeled datasets where text passages are tagged as either professional or personal. In one or more embodiments, algorithms including, but not limited to, logistic regression, support vector machines, or deep learning models can be used as part of the training process. One or more embodiments may alternatively, or additionally, utilize keyword analysis. A list of words and phrases commonly associated with professional settings (e.g., "meeting," "report," "deadline," "client") can be established. Similarly, a list of words and phrases associated with personal contexts (e.g., "family," "birthday," "vacation," "feelings") can be established. In response to detecting a conflict between source context and destination context regarding personal and professional topics, a context conflict alert can be rendered and presented. Accordingly, disclosed embodiments can serve to prevent the embarrassment and/or security breaches that can occur when professional and/or personal information is shared to an incorrect destination.

As can now be appreciated, disclosed embodiments provide techniques for preventing an accidental copy-paste action. Accordingly, disclosed embodiments serve to prevent inadvertent disclosure and embarrassment or other negative consequences that can occur when sensitive or personal information is sent to the wrong recipients. Moreover, disclosed embodiments protect privacy by alerting a user when PII data is potentially being shared. Disclosed embodiments prevent the reputational damage and loss of trust that can occur if sensitive business information is shared incorrectly. Importantly, disclosed embodiments alert users of a potential incorrect copy-paste action before information is sent, thereby giving a user an opportunity to carefully review the information being pasted and the application window where the information is being pasted, to determine if the copy-paste action is what the user intended. If the copy-paste action is determined to be an accidental copy-paste action, the user can cancel the paste action, thereby preventing sending information to unintended recipients. If the copy-paste action is determined to be a correct action, a user can override the alert and paste/send the content as the user had intended. Thus, disclosed embodiments serve to improve the technical field of electronic communication.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
- at least one output device, including a display;
- at least one input device that enables selection and copying of content; and
- a processor communicatively coupled to the display, the at least one output device, and the at least one input device, the processor configured to cause the electronic device to:
  - obtain content selected via the at least one input device from an application window that is rendered on the display;
  - determine a source context from the selected content;
  - detect a paste operation that inserts the selected content into a communication window rendered on the display, the communication window enabling sharing of provided content with one or more participants associated with the communication window, in response to selection of a transmit option;
  - determine a destination context, based at least in part on identifying the one or more participants in the communication window or identifying a uniform resource locator (URL) corresponding to the communication window;
  - identify a conflict between the source context and the destination context; and
  - in response to identifying the conflict:
    - suspend a transmit option for forwarding the selected content via the communication window; and
    - render a context conflict alert via an output device among the at least one output device.

2. The electronic device of claim 1, wherein to determine the source context, the processor is further configured to:
- identify a Uniform Resource Locator (URL) associated with the application window; and
- determine the source context at least in part based on a hostname corresponding to the URL.

3. The electronic device of claim 1, wherein to determine a source context, the processor is further configured to:
- identify one or more user identifiers associated with the application window;
- determine a role for each of the one or more user identifiers; and
- establish the source context as personal or professional, based on the determined role for each of the one or more user identifiers.

4. The electronic device of claim 3, wherein the processor is further configured to:
- in order to determine the destination context:
  - identify one or more user identifiers associated with the one or more participants in the communication window;
  - determine a role for each of the one or more user identifiers; and
  - establish a destination context as personal or professional, based on the determined role for each of the one or more user identifiers; and
- render the context conflict alert in response to the source context being one of personal or professional while the destination context is the other of personal or professional.

5. The electronic device of claim 1, wherein to determine a source context, the processor is configured to:
- identify text within the selected content;
- detect personally identifiable information (PII) within the identified text from a group comprising an email address, telephone number, full name, social security number, passport number, and account number; and
- establish a source context as PII based on the detected PII.

6. The electronic device of claim 1, wherein to identify a conflict between the source context and the destination context, the processor is further configured to detect a focus change in the communication window.

7. The electronic device of claim 1, wherein to identify a conflict between the source context and the destination context, the at least one processor is further configured to:
- determine a subject for the selected content;
- determine a subject for the communication window based on previously-entered content in the communication window;
- determine a correlation score indicating a correlation level between the subject for the selected content and the subject for the communication window; and
- determine existence of a conflict between the source context and the destination context in response to the correlation score being below a predetermined threshold.

8. The electronic device of claim 1, wherein to identify a conflict between the source context and the destination context, the processor is further configured to determine that the application window from which the selected content originated from is also the communication window in which the selected content is pasted.

9. A method comprising:

obtaining, by a processor of an electronic device that comprises a display and at least one input device, content selected via the at least one input device, from an application window that is rendered on the display;

determining a source context from the selected content;

detecting a paste operation that inserts the selected content into a communication window that is rendered on the display and enables sharing of provided content with one or more participants associated with the communication window, in response to selection of a transmit option;

determining a destination context for the communication window, based at least in part on identifying the one or more participants in the communication window or identifying a uniform resource locator (URL) corresponding to the communication window;

identifying a conflict between the source context and the destination context; and in response to identifying the conflict:

suspending the transmit option for forwarding the selected content via the communication window; and rendering a context conflict alert on the display.

10. The method of claim 9, further comprising:

identifying a Uniform Resource Locator (URL) associated with the application window; and determining the source context at least in part based on a hostname corresponding to the URL.

11. The method of claim 9, wherein determining a source context further comprises:

identifying one or more user identifiers associated with the application window;

determining a role for each of the one or more user identifiers; and establishing the source context as personal or professional, based on the determined role for each of the one or more user identifiers.

12. The method of claim 11, wherein:

determining a destination context further comprises:

identifying one or more user identifiers associated with the communication window;

determining a role for each of the one or more user identifiers; and establishing a destination context as personal or professional, based on the determined role for each of the one or more user identifiers; and the method further comprises rendering the context conflict alert in response to the source context being one of personal or professional while the destination context is the other of personal or professional.

13. The method of claim 9, wherein determining a source context further comprises:

identifying text within the selected content;

detecting personally identifiable information (PII) within the identified text from a group comprising an email address, telephone number, full name, social security number, passport number, and account number; and establishing a source context as PII based on the detected PII.

14. The method of claim 9, wherein identifying a conflict between the source context and the destination context further comprises detecting a focus change for the communication window.

15. The method of claim 9, wherein identifying a conflict between the source context and the destination context further comprises:

determining a subject for the selected content;

determining a subject for the communication window based on previously-entered content in the communication window;

determining a correlation score indicating a correlation level between the subject for the selected content and the subject for the communication window; and determining existence of a conflict between the source context and the destination context to exist in response to the correlation score being below a predetermined threshold.

16. The method of claim 9, wherein identifying a conflict between the source context and the destination context further comprises determining that the application window from which the selected content originated is also the communication window in which the selected content is pasted.

17. A computer program product comprising a non-transitory computer readable medium having program instructions that when executed by a processor of an electronic device comprising a display and at least one input device, configure the electronic device to perform functions comprising:

obtaining content selected via the at least one input device, from an application window that is rendered on the display;

determining a source context from the selected content;

detecting a paste operation that inserts the selected content into a communication window that is rendered on the display and enables sharing of provided content with one or more participants associated with the communication window, in response to selection of a transmit option;

determining a destination context for the communication window, based at least in part on identifying the one or more participants in the communication window or identifying a URL corresponding to the communication window;

identifying a conflict between the source context and the destination context; and in response to identifying the conflict:

suspending the transmit option for forwarding the selected content via the communication window; and rendering a context conflict alert on the display.

18. The computer program product of claim 17, wherein the program instructions for identifying a conflict between the source context and the destination context further comprises program instructions for:

determining a subject for the selected content;

determining a subject for the communication window based on previously-entered content in the communication window;

determining a correlation score indicating a correlation level between the subject for the selected content and the subject for the communication window; and determining existence of a conflict between the source context and the destination context to exist in response to the correlation score being below a predetermined threshold.

19. The electronic device of claim 1, wherein:

the one or more participants comprises at least one recipient, each having an associated user identifier;

the transmit option causes the content in the communication window to be sent to each recipient associated with the communication window; and to determine a destination context, the at least one processor is further configured to:

identify at least one of a user identifier and a role associated with each of the at least one recipient in the communication window; and determine the destination context based on the at least one of the user identifier and the role of the at least one recipient.

20. The method of claim 9, wherein:

the one or more participants comprises at least one recipient, each having an associated user identifier;

the transmit option causes the content in the communication window to be sent to each recipient associated with the communication window; and determining the destination context comprises:

identifying at least one of a user identifier and a role associated with each of the at least one recipient in the communication window; and determine the destination context based on the at least one of the user identifier or the role of the at least one recipient.

* * * * *